US008230364B2

(12) United States Patent
Trepess

(10) Patent No.: US 8,230,364 B2
(45) Date of Patent: Jul. 24, 2012

(54) INFORMATION RETRIEVAL

(75) Inventor: David William Trepess, Basingstoke (GB)

(73) Assignee: Sony United Kingdom Limited, Weybridge (GB)

( * ) Notice: Subject to any disclaimer, the term of this patent is extended or adjusted under 35 U.S.C. 154(b) by 1263 days.

(21) Appl. No.: 10/881,903

(22) Filed: Jun. 30, 2004

(65) Prior Publication Data
US 2005/0004910 A1   Jan. 6, 2005

(30) Foreign Application Priority Data

Jul. 2, 2003   (GB) .................................. 0315505.8

(51) Int. Cl.
G06F 3/048   (2006.01)
G06F 3/00    (2006.01)

(52) U.S. Cl. ........................ 715/853; 715/854; 715/855

(58) Field of Classification Search .................. 715/853, 715/854
See application file for complete search history.

(56) References Cited

U.S. PATENT DOCUMENTS

| | | | | |
|---|---|---|---|---|
| 5,303,330 A | * | 4/1994 | Gersho et al. .................... | 706/16 |
| 5,452,468 A | | 9/1995 | Peterson | |
| 5,515,488 A | * | 5/1996 | Hoppe et al. ................... | 345/440 |
| 5,546,529 A | * | 8/1996 | Bowers et al. .................. | 715/848 |
| 5,619,632 A | * | 4/1997 | Lamping et al. .............. | 345/441 |
| 5,625,767 A | * | 4/1997 | Bartell et al. .................. | 345/440 |
| 5,794,178 A | * | 8/1998 | Caid et al. .......................... | 704/9 |
| 5,812,134 A | * | 9/1998 | Pooser et al. .................. | 715/848 |
| 5,835,085 A | * | 11/1998 | Eick et al. ....................... | 715/853 |
| 5,835,901 A | * | 11/1998 | Duvoisin et al. ................ | 706/19 |
| 5,841,437 A | * | 11/1998 | Fishkin et al. ................. | 345/619 |
| 5,920,864 A | * | 7/1999 | Zhao ................................ | 707/10 |
| 5,963,208 A | * | 10/1999 | Dolan et al. ................... | 715/760 |
| 5,963,965 A | * | 10/1999 | Vogel .............................. | 715/236 |
| 5,982,369 A | * | 11/1999 | Sciammarella et al. ....... | 715/835 |
| 6,034,697 A | * | 3/2000 | Becker .......................... | 345/606 |

(Continued)

FOREIGN PATENT DOCUMENTS

EP          1 225 517         6/2003

(Continued)

OTHER PUBLICATIONS

Lin, et al. "A self organizing Semantic Map for Information Retrieval" 1991, ACM.*

(Continued)

*Primary Examiner* — Steven B Theriault
(74) *Attorney, Agent, or Firm* — Oblon, Spivak, McClelland, Maier & Neustadt, L.L.P.

(57) ABSTRACT

An information retrieval system in which a set of distinct information items map to respective nodes in an array of nodes by mutual similarity of the information items, so that similar information items map to nodes at similar positions in the array of nodes; comprises a search arrangement for selecting a subset of the information items by applying a user-defined search query against the information items, the search arrangement being operable to detect a degree of relevance of each information item in the subset to the search query; and a graphical user interface for displaying a representation of those nodes corresponding to at least some of the subset of information items as a two-dimensional display array of display points within a node display area on a user display; the graphical user interface being operable to display the display points with respective display properties dependent on the detected degree of relevance of the corresponding information item.

24 Claims, 14 Drawing Sheets

U.S. PATENT DOCUMENTS

| | | | | |
|---|---|---|---|---|
| 6,047,277 | A * | 4/2000 | Parry et al. | 706/20 |
| 6,070,176 | A * | 5/2000 | Downs et al. | 715/234 |
| 6,075,530 | A * | 6/2000 | Lucas et al. | 715/804 |
| 6,094,652 | A | 7/2000 | Faisal | |
| 6,108,004 | A * | 8/2000 | Medl | 715/804 |
| 6,134,537 | A * | 10/2000 | Pao et al. | 706/16 |
| 6,154,213 | A * | 11/2000 | Rennison et al. | 715/854 |
| 6,189,002 | B1 * | 2/2001 | Roitblat | 707/1 |
| 6,233,571 | B1 * | 5/2001 | Egger et al. | 707/2 |
| 6,260,036 | B1 * | 7/2001 | Almasi et al. | 707/2 |
| 6,278,799 | B1 * | 8/2001 | Hoffman | 382/159 |
| 6,295,514 | B1 * | 9/2001 | Agrafiotis et al. | 703/12 |
| 6,301,579 | B1 * | 10/2001 | Becker | 707/102 |
| 6,307,573 | B1 * | 10/2001 | Barros | 715/764 |
| 6,317,739 | B1 * | 11/2001 | Hirata et al. | 707/4 |
| 6,347,313 | B1 * | 2/2002 | Ma et al. | 707/711 |
| 6,356,899 | B1 * | 3/2002 | Chakrabarti et al. | 707/5 |
| 6,363,378 | B1 | 3/2002 | Conklin et al. | |
| 6,373,484 | B1 * | 4/2002 | Orell et al. | 345/420 |
| 6,377,287 | B1 * | 4/2002 | Hao et al. | 715/853 |
| 6,411,949 | B1 * | 6/2002 | Schaffer | 707/2 |
| 6,434,556 | B1 * | 8/2002 | Levin et al. | 707/5 |
| 6,486,898 | B1 * | 11/2002 | Martino et al. | 715/853 |
| 6,556,225 | B1 * | 4/2003 | MacPhail | 715/848 |
| 6,563,521 | B1 * | 5/2003 | Perttunen | 715/854 |
| 6,574,378 | B1 * | 6/2003 | Lim | 382/305 |
| 6,574,632 | B2 * | 6/2003 | Fox et al. | 1/1 |
| 6,574,635 | B2 * | 6/2003 | Stauber et al. | 707/704 |
| 6,628,313 | B1 * | 9/2003 | Minakuchi et al. | 715/853 |
| 6,629,097 | B1 * | 9/2003 | Keith | 707/5 |
| 6,636,853 | B1 * | 10/2003 | Stephens, Jr. | 1/1 |
| 6,711,586 | B1 * | 3/2004 | Wells | 707/104.1 |
| 6,725,217 | B2 * | 4/2004 | Chow et al. | 707/6 |
| 6,766,316 | B2 * | 7/2004 | Caudill et al. | 1/1 |
| 6,775,659 | B2 * | 8/2004 | Clifton-Bligh | 707/1 |
| 6,795,826 | B2 * | 9/2004 | Flinn et al. | 707/100 |
| 6,868,525 | B1 * | 3/2005 | Szabo | 715/738 |
| 6,879,332 | B2 * | 4/2005 | Decombe | 715/764 |
| 6,888,554 | B1 * | 5/2005 | Decombe | 345/645 |
| 6,920,453 | B2 * | 7/2005 | Mannila et al. | 1/1 |
| 6,928,436 | B2 * | 8/2005 | Baudel | 707/6 |
| 6,931,604 | B2 * | 8/2005 | Lane | 715/853 |
| 6,941,321 | B2 * | 9/2005 | Schuetze et al. | 707/103 R |
| 6,944,830 | B2 * | 9/2005 | Card et al. | 715/853 |
| 6,947,930 | B2 * | 9/2005 | Anick et al. | 707/5 |
| 6,950,989 | B2 * | 9/2005 | Rosenzweig et al. | 715/721 |
| 6,952,208 | B1 * | 10/2005 | Arquie et al. | 345/440 |
| 6,976,020 | B2 * | 12/2005 | Anthony et al. | 707/6 |
| 6,990,228 | B1 * | 1/2006 | Saffer et al. | 382/224 |
| 6,996,774 | B2 * | 2/2006 | Liongosari et al. | 715/236 |
| 6,999,959 | B1 * | 2/2006 | Lawrence et al. | 1/1 |
| 7,003,737 | B2 * | 2/2006 | Chiu et al. | 715/848 |
| 7,036,093 | B2 * | 4/2006 | Decombe | 715/853 |
| 7,047,255 | B2 * | 5/2006 | Imaichi et al. | 707/104.1 |
| 7,082,403 | B2 * | 7/2006 | Wagner et al. | 705/8 |
| 7,099,854 | B2 * | 8/2006 | Liongosari | 706/45 |
| 7,106,329 | B1 * | 9/2006 | Miller et al. | 345/440 |
| 7,113,954 | B2 * | 9/2006 | Vogel | 707/101 |
| 7,146,359 | B2 * | 12/2006 | Castellanos | 1/1 |
| 7,197,451 | B1 * | 3/2007 | Carter et al. | 704/10 |
| 7,203,701 | B1 * | 4/2007 | Packebush et al. | 707/103 Y |
| 7,216,299 | B2 * | 5/2007 | Knight | 715/764 |
| 7,249,127 | B2 * | 7/2007 | Azzam | 707/4 |
| 7,251,637 | B1 * | 7/2007 | Caid et al. | 706/15 |
| 7,268,791 | B1 * | 9/2007 | Jannink | 345/619 |
| 7,287,234 | B2 * | 10/2007 | Leah et al. | 715/853 |
| 7,290,223 | B2 * | 10/2007 | Decombe | 715/853 |
| 7,292,243 | B1 * | 11/2007 | Burke | 345/440 |
| 7,373,612 | B2 * | 5/2008 | Risch et al. | 715/850 |
| 7,565,627 | B2 * | 7/2009 | Brill et al. | 715/854 |
| 7,672,950 | B2 * | 3/2010 | Eckardt et al. | 707/999.01 |
| 7,747,965 | B2 * | 6/2010 | Holecek et al. | 715/781 |
| 2002/0042793 | A1 * | 4/2002 | Choi | 707/6 |
| 2002/0055919 | A1 * | 5/2002 | Mikheev | 707/3 |
| 2002/0171682 | A1 | 11/2002 | Frank et al. | |
| 2003/0069908 | A1 * | 4/2003 | Anthony et al. | 707/513 |
| 2003/0093395 | A1 * | 5/2003 | Shetty et al. | 707/1 |
| 2003/0130998 | A1 * | 7/2003 | Fox et al. | 707/3 |
| 2003/0208485 | A1 * | 11/2003 | Castellanos | 707/5 |
| 2003/0220747 | A1 * | 11/2003 | Vailaya et al. | 702/19 |
| 2004/0030741 | A1 * | 2/2004 | Wolton et al. | 709/202 |
| 2004/0083199 | A1 * | 4/2004 | Govindugari et al. | 707/1 |
| 2004/0090472 | A1 * | 5/2004 | Risch et al. | 345/853 |
| 2004/0103070 | A1 * | 5/2004 | Joseph et al. | 706/12 |
| 2004/0161734 | A1 * | 8/2004 | Knutson | 434/335 |
| 2005/0102251 | A1 * | 5/2005 | Gillespie | 707/1 |
| 2005/0114786 | A1 * | 5/2005 | Decombe | 715/764 |
| 2006/0288023 | A1 * | 12/2006 | Szabo | 707/100 |
| 2007/0033221 | A1 * | 2/2007 | Copperman et al. | 707/103 R |
| 2007/0156677 | A1 * | 7/2007 | Szabo | 707/5 |
| 2007/0214126 | A1 * | 9/2007 | Kikinis | 707/3 |

FOREIGN PATENT DOCUMENTS

| | | |
|---|---|---|
| JP | 5-174065 | 7/1993 |
| JP | 11-45276 | 2/1999 |
| JP | 11-154153 | 6/1999 |
| JP | 2001-266659 | 9/2001 |

OTHER PUBLICATIONS

Kohonen et al. "Self Organization of a Massive Document Collection" Feb. 2, 2000 IEEE.*

Yang, et al. "Internet Browsing: Visualizing Category Map by fisheye and Fractal Views" 2002 IEEE.*

Cartia Inc. "ThemeScape" Oct. 9, 2000.*

IEEE Transactions on Neural Networks, vol. 11, No. 3, May 2000, pp. 574-585, Kohonen et al., "Self Organization of a Massive Document Collection."

Proceedings of IJCNN'98, 1998 IEEE International Joint Conference on Neural Networks, Anchorage, Alaska, May 4-9, 1998, Samuel Kaski, "Dimensionally Reduction by Random Mapping: Fast Similarity Computation for Clustering.".

Andreas Rauber, et al., "Andreas, Rauber'? Conference Pages are over There, German Documents on the Lower Left, An "Old-Fashioned" Approach to Web Search Results Visualization", Database and Expert Systems Applications, IEEE, XP-010515556, Sep. 4, 2000, pp. 615-619.

Andreas Rauber, et al., "A Metaphor Graphics Based Representation of Digital Libraries on the World Wide Web: Using the libViewer to Make Metadata Visible", Database and Expert Systems Applications, IEEE COMPUT. SOC., XP-010352477, Sep. 1, 1999, pp. 286-290.

Vadim Gorokhovsky, et al., "Layered Windows, A New Way to Use Translucency and Transparency Effects in Windows Applications", XP-002354125, Jan. 2000, 6 pages.

Xia Lin, et al., "A Self-organizing Semantic Map for Information Retrieval", Proceedings of the Annual International ACM/SIGIR Conference on Research and Development in Information Retrieval, vol. conf. 14, XP-000239177, Oct. 13, 1991, pp. 262-269.

Kenji Hatano, "A Classification View Mechanism for web documents based on Self-Organizing Maps and Search Engines," Journal of Information Processing Society, Japan, Information Processing Society of Japan, Feb. 15, 1999, vol. 40, No. SIG3 (TOD1), pp. 47-59.

Toshiyuki Masui, "On the Street Corner of Interface 07'," UNIX Magazine, Japan, Ascii corporation, Jun. 1, 1998, vol. 40, No. 6, pp. 161-167.

Kenji Wakamatsu et al., Dusk View: "*Attribute information representation using transparency*" (Tomeido wo mochiita zokusei joho hyogen [in Japanese]), Lecture note/Software engineering 18, Interactive System and Software V, Japan, Kindai Kagaku sha Co., Ltd., Dec. 20, 1997, first edition, pp. 107-112.

* cited by examiner

INFORMATION RETRIEVAL

BACKGROUND OF THE INVENTION

1. Field of the Invention

This invention relates to information retrieval.

Although the invention is not restricted to the field of information search systems, to assist with an understanding of the invention a problem will be described with reference to that field.

2. Description of Prior Art

There are many established systems for locating information (e.g. documents, images, emails, patents, internet content or media content such as audio/video content) by searching under keywords. Examples include internet search "engines" such as those provided by "Google"™ or "Yahoo"™ where a search carried out by keyword leads to a list of results which are ranked by the search engine in order of perceived relevance.

However, in a system encompassing a large amount of content, often referred to as a massive content collection, it can be difficult to formulate effective search queries to give a relatively short list of search "hits". For example, at the time of preparing the present application, a Google search on the keywords "massive document collection" drew 243000 hits. This number of hits would be expected to grow if the search were repeated later, as the amount of content stored across the internet generally increases with time. Reviewing such a list of hits can be prohibitively time-consuming.

In general, some reasons why massive content collections are not well utilised are:
- a user doesn't know that relevant content exists
- a user knows that relevant content exists but does not know where it can be located
- a user knows that content exists but does not know it is relevant
- a user knows that relevant content exists and how to find it, but finding the content takes a long time The paper "Self Organisation of a Massive Document Collection", Kohonen et al, IEEE Transactions on Neural Networks, Vol 11, No. 3, May 2000, pages 574-585 discloses a technique using so-called "self-organising maps" (SOMs). These make use of so-called unsupervised self-learning neural network algorithms in which "feature vectors" representing properties of each document are mapped onto nodes of a SOM.

In the Kohonen et al paper, a first step is to pre-process the document text, and then a feature vector is derived from each pre-processed document. In one form, this may be a histogram showing the frequencies of occurrence of each of a large dictionary of words. Each data value (i.e. each frequency of occurrence of a respective dictionary word) in the histogram becomes a value in an n-value vector, where n is the total number of candidate words in the dictionary (43222 in the example described in this paper). Weighting may be applied to the n vector values, perhaps to stress the increased relevance or improved differentiation of certain words.

The n-value vectors are then mapped onto smaller dimensional vectors (i.e. vectors having a number of values m (500 in the example in the paper) which is substantially less than n. This is achieved by multiplying the vector by an (n×m) "projection matrix" formed of an array of random numbers. This technique has been shown to generate vectors of smaller dimension where any two reduced-dimension vectors have much the same vector dot product as the two respective input vectors. This vector mapping process is described in the paper "Dimensionality Reduction by Random Mapping: Fast Similarity Computation for Clustering", Kaski, Proc IJCNN, pages 413-418, 1998.

The reduced dimension vectors are then mapped onto nodes (otherwise called neurons) on the SOM by a process of multiplying each vector by a "model" (another vector). The models are produced by a learning process which automatically orders them by mutual similarity onto the SOM, which is generally represented as a two-dimensional grid of nodes. This is a non-trivial process which took Kohonen et al six weeks on a six-processor computer having 800 MB of memory, for a document database of just under seven million documents. Finally the grid of nodes forming the SOM is displayed, with the user being able to zoom into regions of the map and select a node, which causes the user interface to offer a link to an internet page containing the document linked to that node.

However, even with the convenient display techniques described above, it is still possible that a search may result in an inconveniently large number of citations, making it difficult for the user to handle the citations in an effective way.

SUMMARY OF THE INVENTION

The invention provides an information retrieval system in which a set of distinct information items map to respective nodes in an array of nodes by mutual similarity of said information items, so that similar information items map to nodes at similar positions in said array of nodes; the system comprising:

(i) a search arrangement for selecting a subset of said information items by applying a user-defined search query against said information items, said search arrangement being operable to detect a degree of relevance of each information item in said subset to said search query; and (ii) a graphical user interface for displaying a representation of those nodes corresponding to at least some of said subset of information items as a two-dimensional display array of display points within a node display area on a user display;

(iii) the graphical user interface being operable to display said display points with respective display properties dependent on said detected degree of relevance of a corresponding information item.

The invention addresses the problem of dealing with potentially large numbers of citations of differing relevance by applying different display properties to the corresponding display points, in dependence on the perceived relevance of the corresponding information items. For example, the display points could be displayed in differing degrees of transparency so that more relevant citations are displayed in a less transparent form. This will tend to bring the more relevant citations to the user's attention, while still providing some indication of the presence of the less relevant citations.

Preferably the information items are arranged as a number of distinct categories, the graphical user interface being operable to display the display points in respective colours associated with the category of the corresponding information items.

Preferably the graphical user interface is operable to display a user control panel at least partly overlapping the node display area, the user control panel being displayed partly transparently so that at least some displayed display points are not obscured by an overlap with the user control panel. This feature is particularly useful in portable devices (such as so-called personal digital assistants) in which the available screen area is limited. It allows a dual-use of at least some screen area, and has the added benefit of filtering out some of the less relevant citations, in that the more transparent citations are less likely to show up in the overlapped screen area.

It is preferred that the system comprises a user control for choosing one or more information items from the subset; the graphical user interface being operable to alter the manner of display within the display area of display points corresponding to chosen information items.

Again, in order to help the user distinguish them, it is preferred that the graphical user interface is operable to display in a different colour and/or intensity those display points corresponding to chosen information items. Preferably the graphical user interface is operable to display points corresponding to chosen information items with time-varying display properties (e.g. as flashing text).

Although the search arrangement could be self-contained, in alternative embodiments the search arrangement comprises an interface to an internet search provider, so that the search query is communicated to the internet search provider, and search results, with associated degrees of relevance assigned by the internet search provider, are received from the internet search provider.

With some search providers, the perceived degree of relevance may be indicated on an absolute scale, for example as a percentage measure. In other situations, the internet search provider may be operable to communicate the search results with degrees of relevance implied by the order in which the search citations are communicated.

Further respective aspects and features of the invention are defined in the appended claims.

BRIEF DESCRIPTION OF THE DRAWINGS

The above and other objects, features and advantages of the invention will be apparent from the following detailed description of illustrative embodiments which is to be read in connection with the accompanying drawings, in which:

Figure 4A:
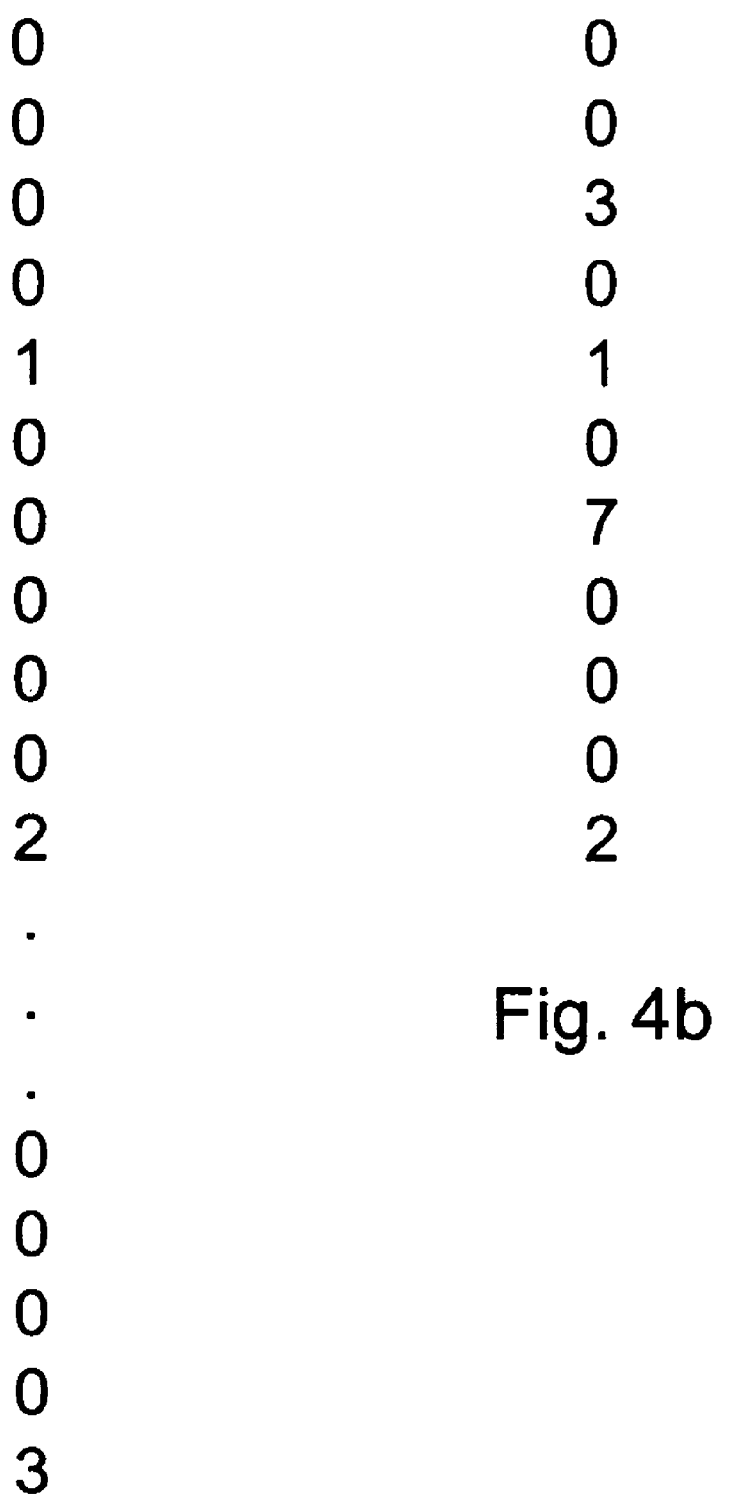

FIG. 4a schematically illustrates a raw feature vector;

FIG. 4b schematically illustrates a reduced feature vector;

DESCRIPTION OF THE PREFERRED EMBODIMENTS

Figure 1:
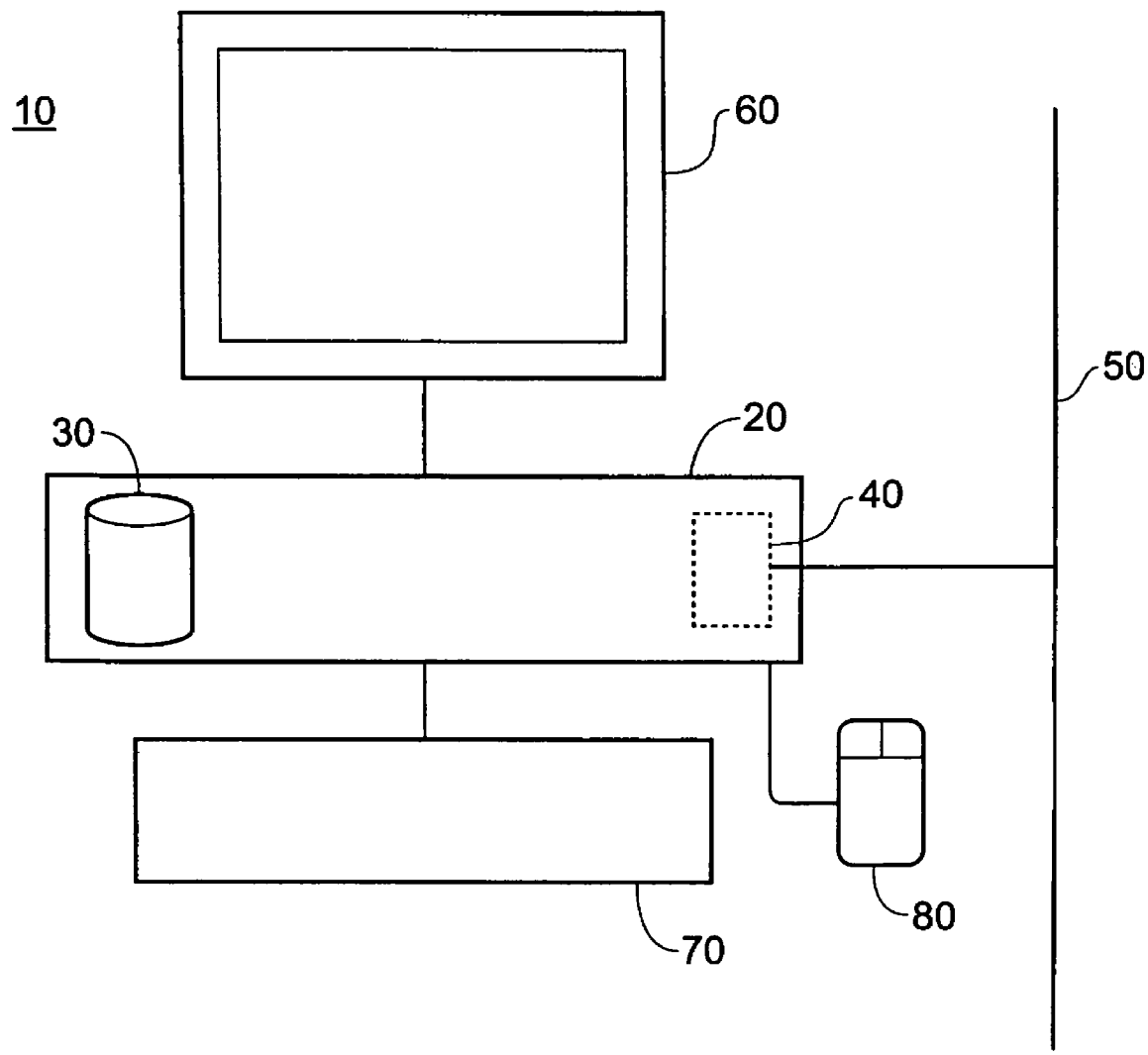
FIG. 1 schematically illustrates an information storage and retrieval system.

FIG. 1 is a schematic diagram of an information storage and retrieval system based around a general-purpose computer 10 having a processor unit 20 including disk storage 30 for programs and data, a network interface card 40 connected to a network 50 such as an Ethernet network or the Internet, a display device such as a cathode ray tube device 60, a keyboard 70 and a user input device such as a mouse 80. The system operates under program control, the programs being stored on the disk storage 30 and provided, for example, by the network 50, a removable disk (not shown) or a pre-installation on the disk storage 30.

The storage system operates in two general modes of operation. In a first mode, a set of information items (e.g. textual information items) is assembled on the disk storage 30 or on a network disk drive connected via the network 50 and is sorted and indexed ready for a searching operation. The second mode of operation is the actual searching against the indexed and sorted data.

The embodiments are applicable to many types of information items. A non-exhaustive list of appropriate types of information includes patents, video material, emails, presentations, internet content, broadcast content, business reports, audio material, graphics and clipart, photographs and the like, or combinations or mixtures of any of these. In the present description, reference will be made to textual information items, or at least information items having a textual content or association. So, for example, a piece of broadcast content such as audio and/or video material may have associated "MetaData" defining that material in textual terms.

The information items are loaded onto the disk storage 30 in a conventional manner. Preferably, they are stored as part of a database structure which allows for easier retrieval and indexing of the items, but this is not essential. Once the information and items have been so stored, the process used to arrange them for searching is shown schematically in FIG. 2.

It will be appreciated that the indexed information data need not be stored on the local disk drive 30. The data could be stored on a remote drive connected to the system 10 via the network 50. Alternatively, the information may be stored in a distributed manner, for example at various sites across the internet. If the information is stored at different internet or network sites, a second level of information storage could be used to store locally a "link" (e.g. a URL) to the remote information, perhaps with an associated summary, abstract or MetaData associated with that link. So, the remotely held information would not be accessed unless the user selected the relevant link (e.g. from the results list 260 to be described below), although for the purposes of the technical description which follows, the remotely held information, or the abstract/summary/MetaData, or the link/URL could be considered as the "information item".

In other words, a formal definition of the "information item" is an item from which a feature vector is derived and processed (see below) to provide a mapping to the SOM. The data shown in the results list 260 (see below) may be the information item itself (if it is held locally and is short enough for convenient display) or may be data representing and/or pointing to the information item, such as one or more of MetaData, a URL, an abstract, a set of key words, a representative key stamp image or the like. This is inherent in the operation "list" which often, though not always, involves listing data representing a set of items.

In a further example, the information items could be stored across a networked work group, such as a research team or a legal firm. A hybrid approach might involve some information items stored locally and/or some information items stored across a local area network and/or some information items stored across a wide area network. In this case, the system could be useful in locating similar work by others, for example in a large multi-national research and development organisation, similar research work would tend to be mapped to similar output nodes in the SOM (see below). Or, if a new television programme is being planned, the present technique could be used to check for its originality by detecting previous programmes having similar content.

It will also be appreciated that the system 10 of FIG. 1 is but one example of possible systems which could use the indexed information items. Although it is envisaged that the initial (indexing) phase would be carried out by a reasonably powerful computer, most likely by a non-portable computer, the later phase of accessing the information could be carried out at a portable machine such as a "personal digital assistant" (a term for a data processing device with display and user input devices, which generally fits in one hand), a portable computer such as a laptop computer, or even devices such as a mobile telephone, a video editing apparatus or a video camera. In general, practically any device having a display could be used for the information-accessing phase of operation.

The processes are not limited to particular numbers of information items.

Figure 2:
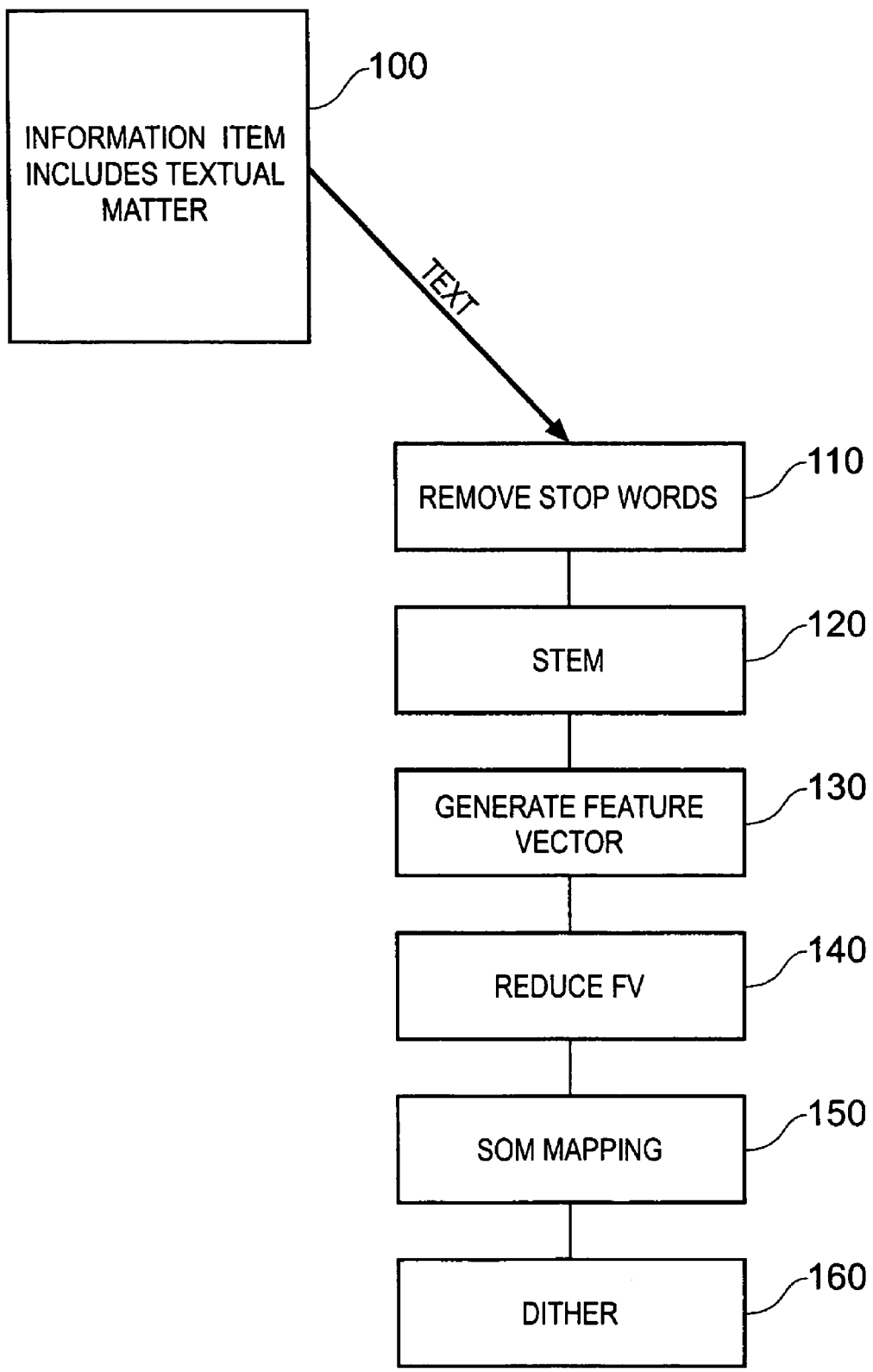
FIG. 2 is a schematic flow chart showing the generation of a self-organising map (SOM)

The process of generating a self-organising map (SOM) representation of the information items will now be described with reference to FIGS. 2 to 6. FIG. 2 is a schematic flow chart illustrating a so-called "feature extraction" process followed by an SOM mapping process.

Feature extraction is the process of transforming raw data into an abstract representation. These abstract representations can then be used for processes such as pattern classification, clustering and recognition. In this process, a so-called "feature vector" is generated, which is an abstract representation of the frequency of terms used within a document.

The process of forming the visualisation through creating feature vectors includes:
  Create "document database dictionary" of terms
  Create "term frequency histograms" for each individual document based on the "document database dictionary"
  Reduce the dimension of the "term frequency histogram" using random mapping
  Create a 2-dimensional visualisation of the information space.

Considering these steps in more detail, each document (information item) 100 is opened in turn. At a step 110, all "stop words" are removed from the document. Stop-words are extremely common words on a pre-prepared list, such as "a", "the", "however", "about", "and", and "the". Because these words are extremely common they are likely, on average, to appear with similar frequency in all documents of a sufficient length. For this reason they serve little purpose in trying to characterise the content of a particular document and should therefore be removed.

After removing stop-words, the remaining words are stemmed at a step 120, which involves finding the common stem of a word's variants. For example the words "thrower", "throws", and "throwing" have the common stem of "throw".

A "dictionary" of stemmed words appearing in the documents (excluding the "stop" words) is maintained. As a word is newly encountered, it is added to the dictionary, and running count of the number of times the word has appeared in the whole document collection (set of information items) is also recorded.

The result is a list of terms used in all the documents in the set, along with the frequency with which those terms occur. Words that occur with too high or too low a frequency are discounted, which is to say that they are removed from the dictionary and do not take part in the analysis which follows. Words with too low a frequency may be misspellings, made up, or not relevant to the domain represented by the document set. Words that occur with too high a frequency are less appropriate for distinguishing documents within the set. For example, the term "News" is used in about one third of all documents in the a test set of broadcast-related documents, whereas the word "football" is used in only about 2% of documents in the test set. Therefore "football" can be assumed to be a better term for characterising the content of a document than "News". Conversely, the word "fottball" (a misspelling of "football") appears only once in the entire set of documents, and so is discarded for having too low an occurrence. Such words may be defined as those having a frequency of occurrence which is lower than two standard deviations less than the mean frequency of occurrence, or which is higher than two standard deviations above the mean frequency of occurrence.

A feature vector is then generated at a step 130.

Figure 3A:
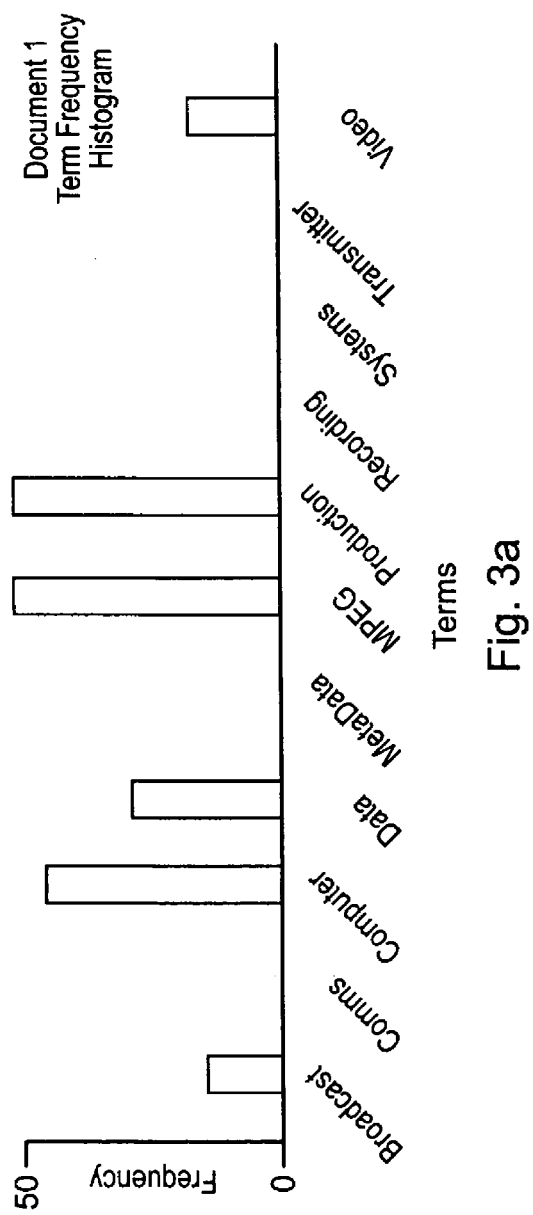
FIGS. 3a and 3b schematically illustrate term frequency histograms.
Figure 3B:
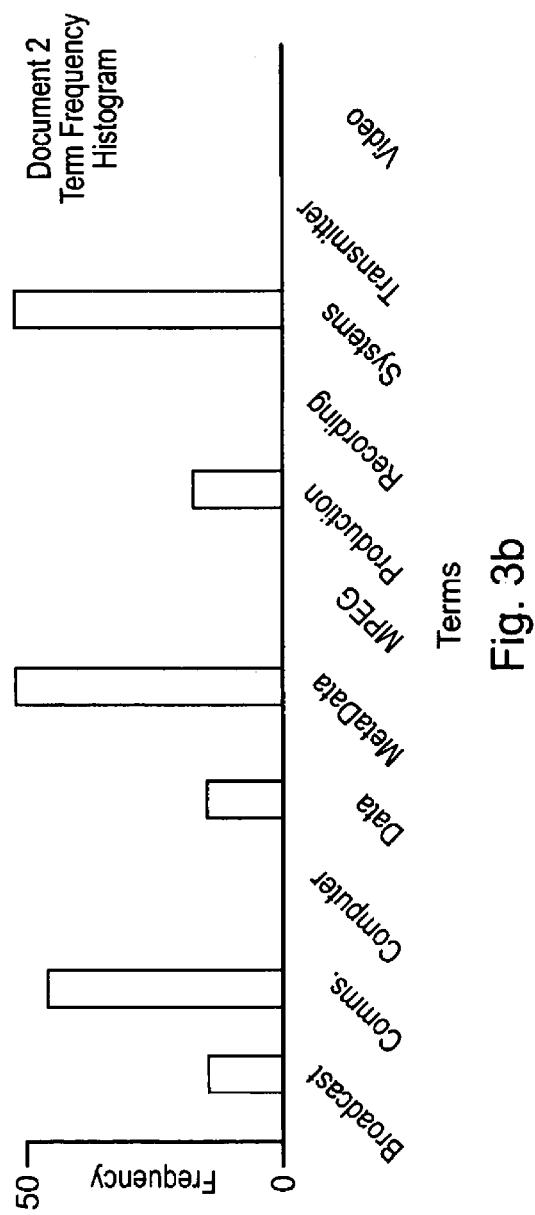

To do this, a term frequency histogram is generated for each document in the set. A term frequency histogram is constructed by counting the number of times words present in the dictionary (pertaining to that document set) occur within an individual document. The majority of the terms in the dictionary will not be present in a single document, and so these terms will have a frequency of zero. Schematic examples of term frequency histograms for two different documents are shown in FIGS. 3*a* and 3*b*.

It can be seen from this example how the histograms characterise the content of the documents. By inspecting the examples it is seen that document 1 has more occurrences of the terms "MPEG" and "Video" than document 2, which itself has more occurrences of the term "MetaData". Many of the entries in the histogram are zero as the corresponding words are not present in the document.

In a real example, the actual term frequency histograms have a very much larger number of terms in them than the example. Typically a histogram may plot the frequency of over 50000 different terms, giving the histogram a dimension of over 50000. The dimension of this histogram needs to be reduced considerably if it is to be of use in building an SOM information space.

Each entry in the term frequency histogram is used as a corresponding value in a feature vector representing that document. The result of this process is a (50000×1) vector containing the frequency of all terms specified by the dictionary for each document in the document collection. The vector may be referred to as "sparse" since most of the values will typically be zero, with most of the others typically being a very low number such as 1.

The size of the feature vector, and so the dimension of the term frequency histogram, is reduced at a step 140. Two methods are proposed for the process of reducing the dimension of the histogram.
  i) Random Mapping—a technique by which the histogram is multiplied by a matrix of random numbers. This is a computationally cheap process.

ii) Latent Semantic Indexing—a technique whereby the dimension of the histogram is reduced by looking for groups of terms that have a high probability of occurring simultaneously in documents. These groups of words can then be reduced to a single parameter. This is a computationally expensive process.

The method selected for reducing the dimension of the term frequency histogram in the present embodiment is "random mapping", as explained in detail in the Kaski paper referred to above. Random mapping succeeds in reducing the dimension of the histogram by multiplying it by a matrix of random numbers.

As mentioned above, the "raw" feature vector (shown schematically in FIG. 4a) is typically a sparse vector with a size in the region of 50000 values. This can be reduced to size of about 200 (see schematic FIG. 4b) and still preserve the relative characteristics of the feature vector, that is to say, its relationship such as relative angle (vector dot product) with other similarly processed feature vectors. This works because although the number of orthogonal vectors of a particular dimension is limited, the number of nearly orthogonal vectors is very much larger.

In fact as the dimension of the vector increases any given set of randomly generated vectors are nearly orthogonal to each other. This property means that the relative direction of vectors multiplied by a matrix of random numbers will be preserved. This can be demonstrated by showing the similarity of vectors before and after random mapping by looking at their dot product.

It can be shown experimentally that by reducing a sparse vector from 50000 values to 200 values preserves their relative similarities. However, this mapping is not perfect, but suffices for the purposes of characterising the content of a document in a compact way.

Figure 5:
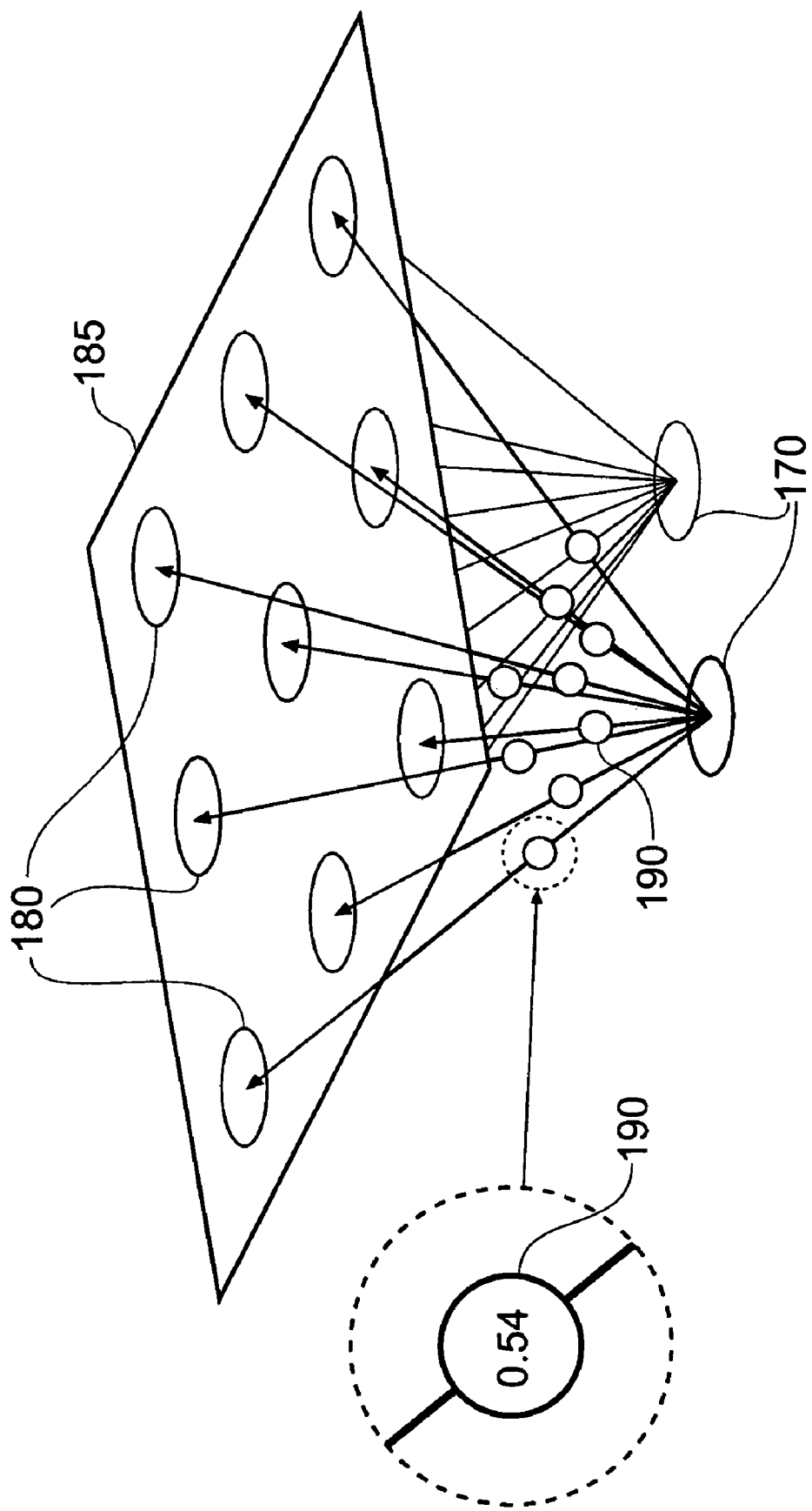
FIG. 5 schematically illustrates an SOM.

Once feature vectors have been generated for the document collection, thus defining the collection's information space, they are projected into a two-dimensional SOM at a step 150 to create a semantic map. The following section explains the process of mapping to 2-D by clustering the feature vectors using a Kohonen self-organising map. Reference is also made to FIG. 5.

A Kohonen Self-Organising map is used to cluster and organise the feature vectors that have been generated for each of the documents.

A self-organising map consists of input nodes 170 and output nodes 180 in a two-dimensional array or grid of nodes illustrated as a two-dimensional plane 185. There are as many input nodes as there are values in the feature vectors being used to train the map. Each of the output nodes on the map is connected to the input nodes by weighted connections 190 (one weight per connection).

Initially each of these weights is set to a random value, and then, through an iterative process, the weights are "trained". The map is trained by presenting each feature vector to the input nodes of the map. The "closest" output node is calculated by computing the Euclidean distance between the input vector and weights of each of the output nodes.

The closest node is designated the "winner" and the weights of this node are trained by slightly changing the values of the weights so that they move "closer" to the input vector. In addition to the winning node, the nodes in the neighbourhood of the winning node are also trained, and moved slightly closer to the input vector.

It is this process of training not just the weights of a single node, but the weights of a region of nodes on the map, that allow the map, once trained, to preserve much of the topology of the input space in the 2-D map of nodes.

Once the map is trained, each of the documents can be presented to the map to see which of the output nodes is closest to the input feature vector for that document. It is unlikely that the weights will be identical to the feature vector, and the Euclidean distance between a feature vector and its nearest node on the map is known as its "quantisation error".

By presenting the feature vector for each document to the map to see where it lies yields and x, y map position for each document. These x, y positions when put in a look up table along with a document ID can be used to visualise the relationship between documents.

Finally, a dither component is added at a step 160, which will be described with reference to FIG. 6 below.

A potential problem with the process described above is that two identical, or substantially identical, information items may be mapped to the same node in the array of nodes of the SOM. This does not cause a difficulty in the handling of the data, but does not help with the visualisation of the data on display screen (to be described below). In particular, when the data is visualised on a display screen, it has been recognised that it would be useful for multiple very similar items to be distinguishable over a single item at a particular node. Therefore, a "dither" component is added to the node position to which each information item is mapped. The dither component is a random addition of ±½ of the node separation. So, referring to FIG. 6, an information item for which the mapping process selects an output node 200 has a dither component added so that it in fact may be mapped to any node position within the area 210 bounded by dotted lines on FIG. 6.

Figure 6:
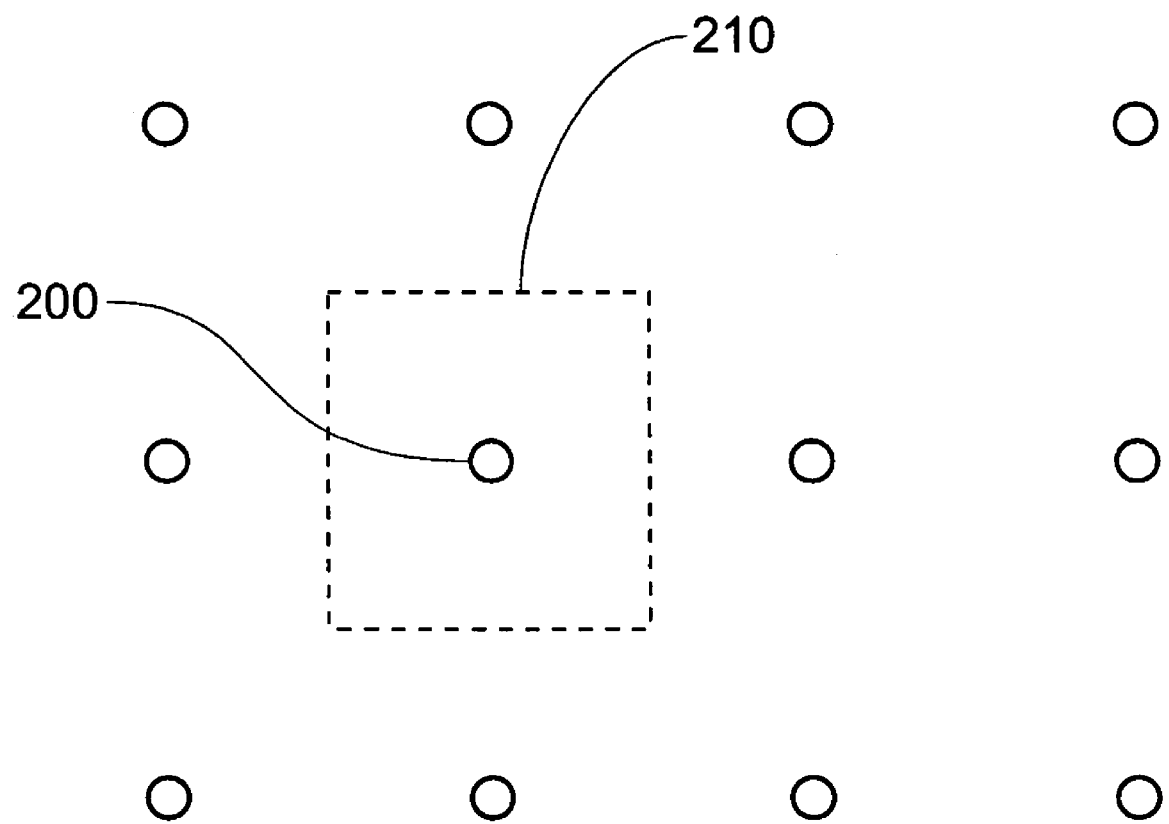
FIG. 6 schematically illustrates a dither process.

So, the information items can be considered to map to positions on the plane of FIG. 6 at node positions other than the "output nodes" of the SOM process.

An alternative approach might be to use a much higher density of "output nodes" in the SOM mapping process described above. This would not provide any distinction between absolutely identical information items, but may allow almost, but not completely, identical information items to map to different but closely spaced output nodes.

Figure 7:
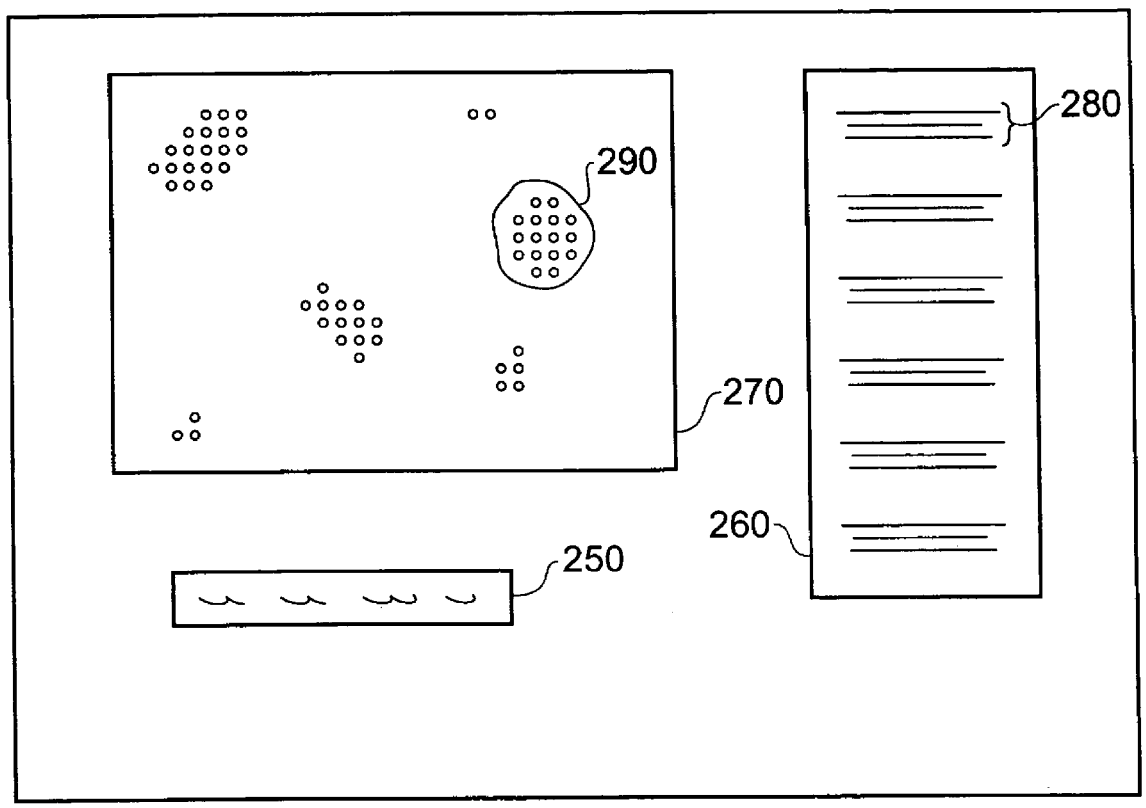
FIGS. 7 to 9 schematically illustrate display screens providing a user interface to access information represented by the SOM.

FIG. 7 schematically illustrates a display on the display screen 60 in which data sorted into an SOM is graphically illustrated for use in a searching operation. The display shows a search enquiry 250, a results list 260 and an SOM display area 270.

In operation, the user types a key word search enquiry into the enquiry area 250. The user then initiates the search, for example by pressing enter on the keyboard 70 or by using the mouse 80 to select a screen "button" to start the search. The key words in the search enquiry box 250 are then compared with the information items in the database using a standard keyword search technique. This generates a list of results, each of which is shown as a respective entry 280 in the list view 260. Also, each result has a corresponding display point on the node display area 270.

Because the sorting process used to generate the SOM representation tends to group mutually similar information items together in the SOM, the results for the search enquiry generally tend to fall in clusters such as a cluster 290. Here, it is noted that each point on the area 270 corresponds to the respective entry in the SOM associated with one of the results in the result list 260; and the positions at which the points are displayed within the area 270 correspond to the array positions of those nodes within the node array.

Figure 8:
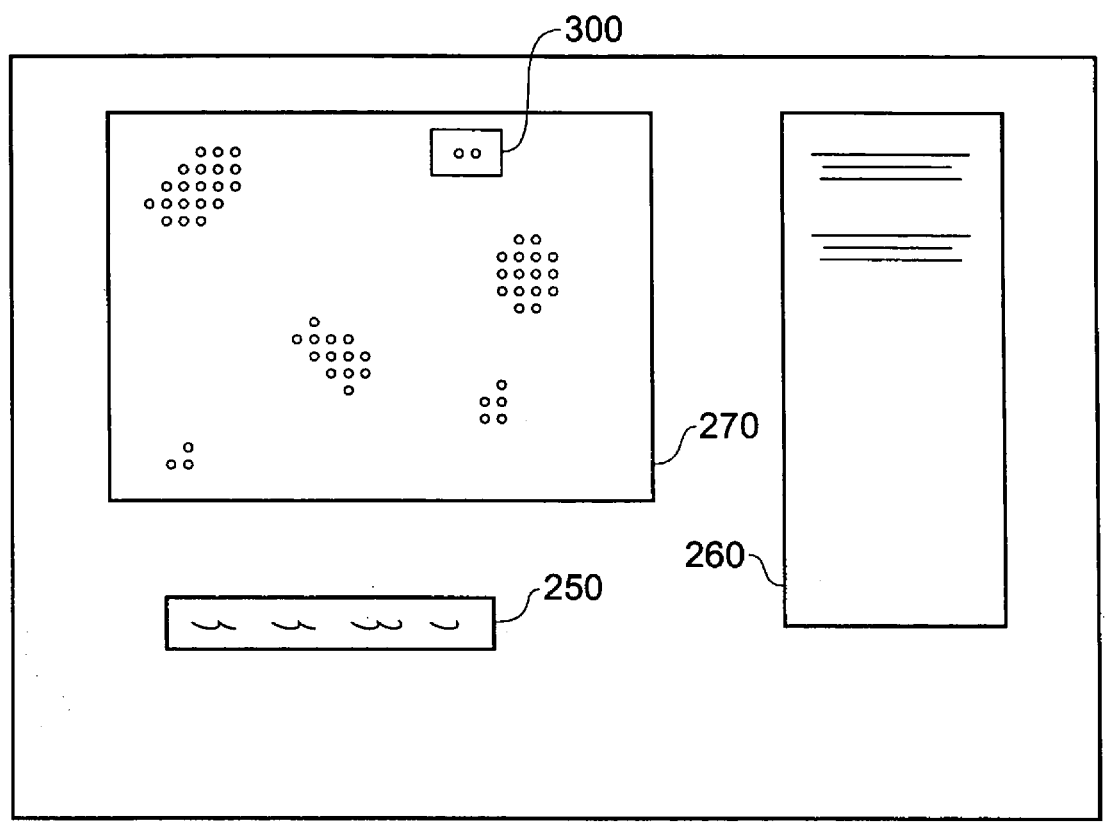

FIG. 8 schematically illustrates a technique for reducing the number of "hits" (results in the result list). The user makes use of the mouse 80 to draw a box 300 around a set of display points corresponding to nodes of interest. In the results list area 260, only those results corresponding to points within the box 300 are displayed. If these results turn out not to be of interest, the user may draw another box encompassing a different set of display points.

It is noted that the results area 260 displays list entries for those results for which display points are displayed within the box 300 and which satisfied the search criteria in the word search area 250. The box 300 may encompass other display positions corresponding to populated nodes in the node array, but if these did not satisfy the search criteria they will not be displayed and so will not form part of the subset of results shown in the box 260.

Figure 9:
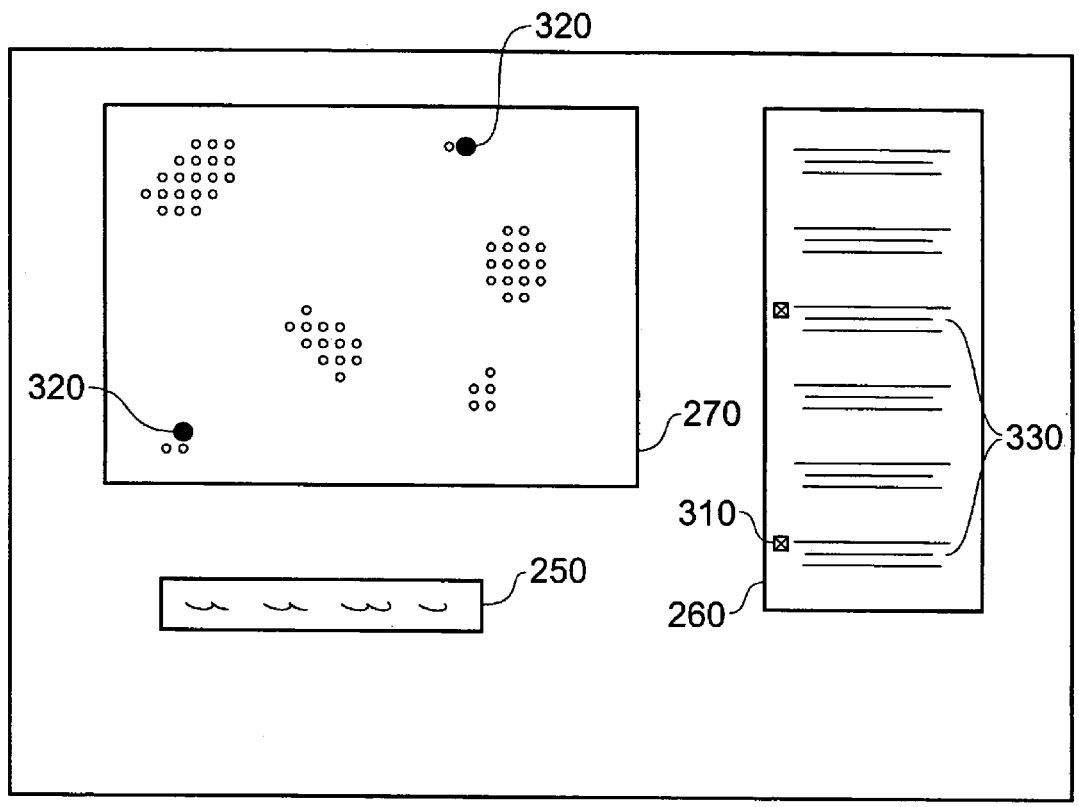

FIG. 9 schematically illustrates a technique for detecting the node position of an entry in the list view 260. Using a standard technique in the field of graphical user interfaces, particularly in computers using the so-called "Windows"™ operating system, the user may "select" one or more of the entries in the results list view. In the examples shown, this is done by a mouse click on a "check box" 310 associated with the relevant results. However, it could equally be done by clicking to highlight the whole result, or by double-clicking on the relevant result and so on. As a result is selected, the corresponding display point representing the respective node in the node array is displayed in a different manner. This is shown schematically for two display points 320 corresponding to the selected results 330 in the results area 260.

The change in appearance might be a display of the point in a larger size, or in a more intense version of the same display colour, or in a different display colour, or in a combination of these varying attributes.

At any time, a new information item can be added to the SOM by following the steps outlined above (i.e. steps 110 to 140) and then applying the resulting reduced feature vector to the "pre-trained" SOM models, that is to say, the set of SOM models which resulted from the self-organising preparation of the map. So, for the newly added information item, the map is not generally "retrained"; instead steps 150 and 160 are used with all of the SOM models not being amended. To retrain the SOM every time a new information item is to be added is computationally expensive and is also somewhat unfriendly to the user, who might grow used to the relative positions of commonly accessed information items in the map.

However, there may well come a point at which a retraining process is appropriate. For example, if new terms (perhaps new items of news, or a new technical field) have entered into the dictionary since the SOM was first generated, they may not map particularly well to the existing set of output nodes. This can be detected as an increase in a so-called "quantisation error" detected during the mapping of newly received information item to the existing SOM. In the present embodiments, the quantisation error is compared to a threshold error amount. If it is greater than the threshold amount then either (a) the SOM is automatically retrained, using all of its original information items and any items added since its creation; or (b) the user is prompted to initiate a retraining process at a convenient time. The retraining process uses the feature vectors of all of the relevant information items and reapplies the steps 150 and 160 in full.

Figure 10:
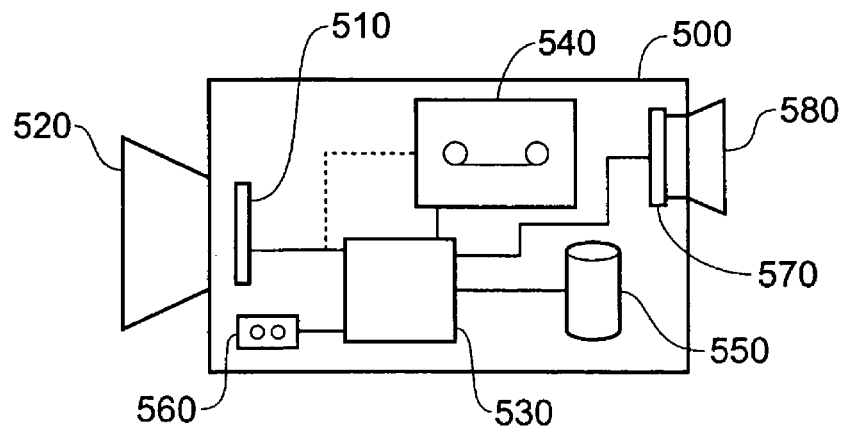
FIG. 10 schematically illustrates a camcorder as an example of a video acquisition and/or processing apparatus.

FIG. 10 schematically illustrates a camcorder 500 as an example of a video acquisition and/or processing apparatus, the camcorder including an image capture device 510 with an associated lens 520; a data/signal processor 530; tape storage 540; disk or other random access storage 550; user controls 560; and a display device 570 with eyepiece 580. Other features of conventional camcorders or other alternatives (such as different storage media or different display screen arrangements) will be apparent to the skilled man. In use, MetaData relating to captured video material may be stored on the storage 550, and an SOM relating to the stored data viewed on the display device 570 and controlled as described above using the user controls 560.

Figure 11:
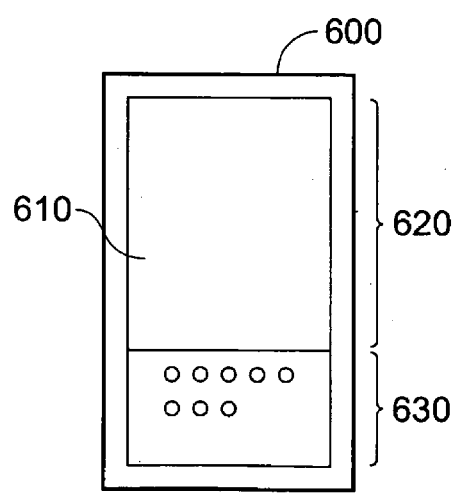
FIG. 11 schematically illustrates a personal digital assistant as an example of portable data processing apparatus.

FIG. 11 schematically illustrates a personal digital assistant (PDA) 600, as an example of portable data processing apparatus, having a display screen 610 including a display area 620 and a touch sensitive area 630 providing user controls; along with data processing and storage (not shown). Again, the skilled man will be aware of alternatives in this field. The PDA may be used as described above in connection with the system of FIG. 1.

Figure 12:
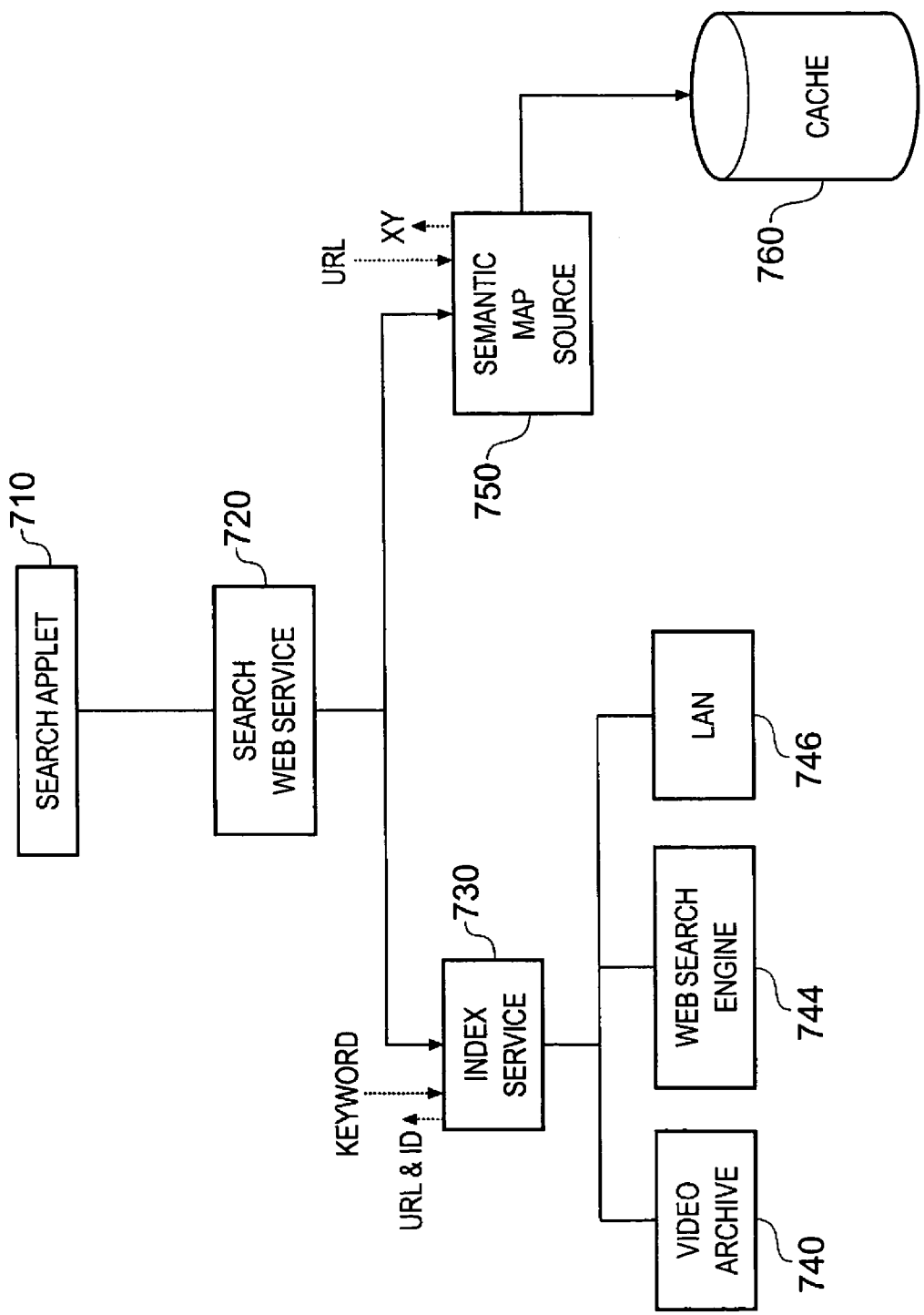
FIG. 12 schematically illustrates an embodiment that provides a search interface for information stored locally and/or remotely at various sites across the Internet.

FIG. 12 schematically illustrates an embodiment of the invention that provides a search interface for information stored both locally and/or remotely, at various sites across the internet. The arrangement comprises a search applet 710, a search web service 720, an index service 730 that interfaces with information sources such as a video archive 742, a web search engine 744 and a local area network (LAN) 746. The arrangement also comprises a semantic map service 750 and an associated cache 760.

The search applet 710 provides a user interface via which the user can enter a search query. The applet is a small application program written in Java, the object-oriented programming language, which can be referenced by the hypertext markup language (HTML) source code of a web page. The search applet 710 can be dynamically downloaded from a Web server to an Internet browser and it executes within the environment provided by the browser. Java is a computer programming language that is designed for use in the distributed computing environment of the Internet. Java programs are portable within a computer network since the source programs are compiled into Java bytecode, which can be run anywhere in a network on a server or client that has a Java virtual machine. The Java virtual machine serves to interpret the bytecode.

To initiate the search the user enters a keyword of interest into a dialog box 250 (see FIG. 13) of a graphical user interface (GUI) associated with the applet and then hits the return key on a computer keyboard or clicks on a "search" action button of the GUI using a mouse. The applet then initiates retrieval of information in dependence upon the user-entered keyword. The search applet 710 communicates with the search web service 720 using Simple Object Access Protocol (SOAP).

SOAP is a protocol that allows a program running in one kind of operating system to communicate with a program in either the same or another operating system using both the Hypertext Transfer Protocol (HTTP) of the World Wide Web and its Extensible Markup Language (XML) as the mechanisms for information exchange. SOAP specifies how to encode an HTTP header and an XML file so that a program in one computer can call a program in a different computer and pass it information. It also specifies how the called program can return a response. By using HTTP SOAP enables a program call to penetrate the firewall servers that are used to screen out requests other than those for known applications, since HTTP requests are usually allowed through firewalls. SOAP comprises three main components: firstly it provides an envelope defining a framework for the contents of a message and how to process the message; secondly it provides a set of encoding rules for flagging instances of application-defined data types; and thirdly it provides a convention for representing remote procedure calls and responses. The present embodiment uses an implementation of SOAP known as AXIS. Alternative embodiments of the invention use protocols other than SOAP to interface between the search applet and the available services. For example alternative embodiments could use a Java Remote Method Invocation (RMI), a Remote Procedure Call (RPC) or a simple Transmission Control Protocol/Internet Protocol (TCP/IP) socket for this purpose.

HTTP is an application layer protocol that comprises a set of rules defining the exchange of text, images, sound, video and other multimedia files on the Web. One of the fundamental concepts of HTTP is that files can contain hypertext links which provide cross-references to information existing anywhere on the Internet. Information, in the form of HTML files, can be transferred or downloaded at the request of a client.

XML is a markup language. The familiar markup language HTML provides instructions to a web browser on how to display a web page's text and images by defining document structure in terms of headings and titles and its presentation in terms of e.g. captions and fonts. By way of contrast, XML provides ways both to define common information formats and to share these formats and associated data on the Web and on intranets. While HTML is restricted to defining how text and information can be displayed and interacted with, XML can give contextual information about a document's contents by allowing application developers to define custom tags which mark sections or words in a document as belonging to a specific data category, e.g. the tags <DATE> and <CHANNEL> could be defined for use in a document containing television programme listings. Data processing tasks can be performed on the XML documents by making use of the custom tags to identify and extract selective information. This is particularly useful for selectively retrieving and categorising content from voluminous information repositories e.g. video archives and document collections.

The Web search service 720 has a Java application server platform and it communicates with the index service 730 and the semantic map source 750 via HTTP. The web search service 720 delivers the user-entered keyword to the index service 130. The index service 730 provides an interface to content in three different information repositories, that is, the video archive 742, the Internet 744 and a local area network 746. The user-entered keyword is supplied to a Web search engine such as "Google"™ to locate relevant web pages. A web search engine is a coordinated set of computer programs that includes: a "spider" that goes to every page or representative pages on every Web site that is search enabled, analyses the content of the web page and uses hypertext links on each page to access other pages of the Web site; a program that creates an extensive index from the web pages that have been read; and a program that receives a search request, compares it to entries in the index and returns matching search citations.

Information content in the video archive 742 and the LAN 746 may be pre-logged. The index service 730 collates from the three repositories 742, 744, 746, all information content determined to be relevant to the user-entered keyword and returns an information locator, short title and brief descriptor for each information item "hit". A uniform resource locator (URL) is used as the information locator. For Web pages a URL typically identifies the HTTP protocol, an Internet server location and a file path and name. However, URLs are also used to identify and locate files in the video archive 742 and on the LAN 746. The URLs and corresponding document descriptors are supplied to the semantic map source 750 where an information item similarity mapping analysis is performed as described above with reference to FIGS. 2 to 6.

In order to generate the feature vector appropriate to each information item for which a URL has been supplied, information is downloaded by the semantic map source 750 and a word frequency analysis is performed on the downloaded data. Recall that the value of each feature vector component is equal to the relative frequency of occurrence of the corresponding word in the document or indeed the metadata describing the associated video clip. Alternatively a function of the frequency of occurrence and the importance of the word can be used to determine feature vector components. To facilitate generation of the feature vectors, the semantic map source 750 is capable of concurrently downloading information from the supplied URLs on 200 parallel program threads. A thread is a sequence of execution within a computer program process. A thread does not have its own address space but uses the memory and other resources of the process in which it executes. The threaded nature of the download improves the efficiency of the mapping. An (x, y) mapping point is calculated from the reduced feature vector for each URL associated with the search keyword, i.e., for each search citation. The (x, y) mapping is used together with the information item descriptor to provide an abstract representation and visualisation of the relationship between search citations via clustering of display points on nodes of the SOM display area 270. Before a mapping operation is performed for each URL, the contents of the cache 760 are first checked to determine if the particular URL has been recently mapped. If a cache hit is established then the (x, y) mapping value is read directly from cache so there is no need either to download the information item or to recalculate the feature vector.

Figure 13:
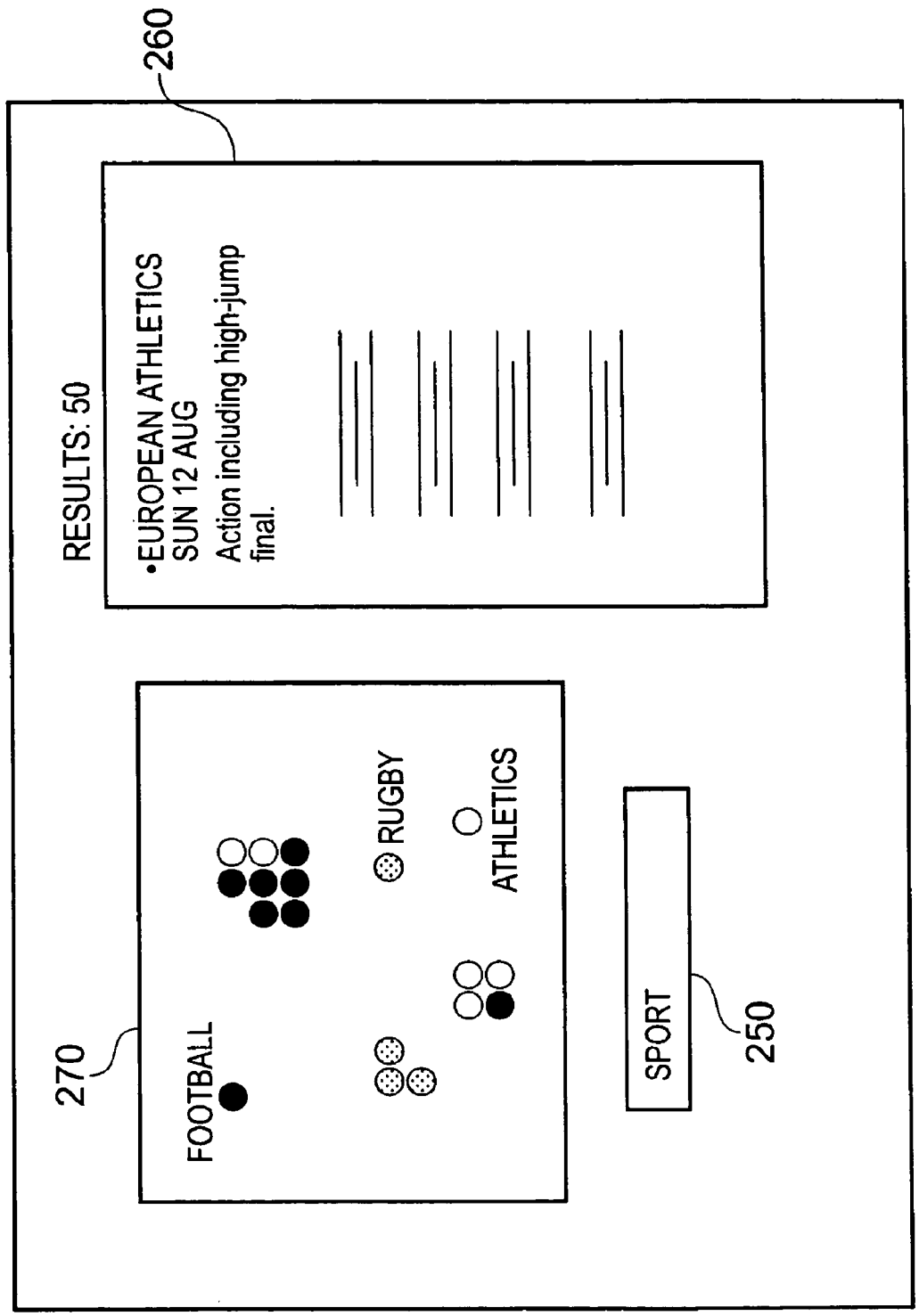
FIG. 13 schematically illustrates a Graphical User Interface (GUI) in which different categories of information are represented by display points having different colours.

FIG. 13 schematically illustrates a graphical user interface in which different categories of information represented by the SOM are distinguished by display points having different colours. As shown in FIG. 13 the user has entered the keyword "sport" in the search enquiry dialog box 250 and a list of results has been generated by correlating the keyword with information items in the searched information repositories, which in this case include the video archive 742, a local area network (LAN) 746 and the Internet via the search engine 744. Each results list citation is displayed in the list view 260 with an information item identifier and a short descriptor. The descriptor and identifier are provided by the index service 730. The list view 260 provides the user with options of displaying the search citations by degree of relevancy, date, type, genre or in alphabetical order. Each display point in the node display area 270 is associated with a search citation. In this example three sub-categories of information items have been returned in response to the "sport" search enquiry, that is, football, rugby and athletics. Each of these three categories of information could be used as an alternative keyword to refine the search. To provide the user with a visualisation of the distribution of search results by content category, the display points in the node area 270 are colour coded by information content category. In this case the information items associated with football are coloured black, the information items associated with rugby are coloured grey and the information items associated with athletics are coloured white. In alternative embodiments different geometrical shapes (e.g. squares, circles, triangles and stars) of display points could be used to distinguish between information categories or indeed different sizes of display points as illustrated in FIG. 9.

Figure 14:
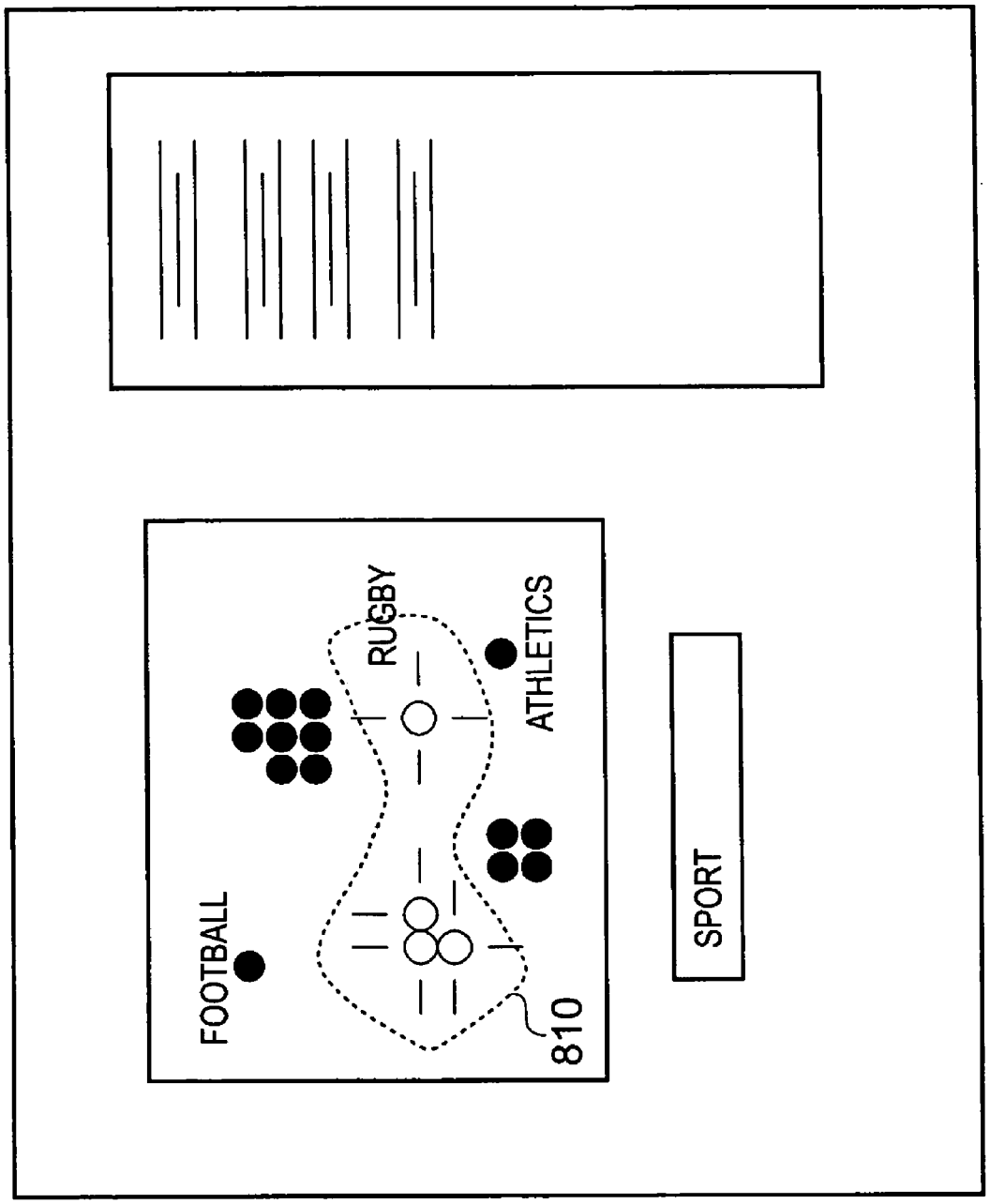
FIG. 14 schematically illustrates a GUI in which certain information items are represented by time-varying display points.

FIG. 14 shows an alternative embodiment in which a chosen category of information, in this case "rugby", is represented by time-varying display points. In particular, the display points 810 associated with information items relevant to rugby flash on and off with a fixed period. The information items associated with rugby are determined to be the most relevant items of the results list on the basis of a refined search initiated by the user in which an alternative keyword (such as the word "rugby" itself) has been entered. The results most relevant to the refined search are then distinguished from the less relevant information items of the full results list by triggering the on-off flashing of the appropriate display points 810. Alternatively, a time-varying display point (e.g. a pulsating dot) may be used to represent an individual information item that has been selected by the user rather than an entire information category. Further alternative embodiments display selected information items using display points of larger or smaller than the standard size or by flagging the selected information items.

In the embodiments of FIG. 13 and FIG. 14, the degree of relevancy of the information item to the search enquiry is assessed from the content categorisation information returned by the index service. The content categorisation information includes a title and a short description of the information item. However, in an alternative embodiment the degree of relevance of web search citations are derived from information returned by the web search engine 744, which provides a percentage relevance value for each search citation. In this case the colours or other properties of the display points could be determined according to distinct relevance bands such that, for example, information items having 60-100% relevance are assigned red display points, information items having 20-60% relevance are assigned green display points and information items having less than 20% relevance are assigned blue display points. Alternatively, the order in which the results list items are returned from the web search engine could be indicative of the degree of relevance, the more relevant information items being returned higher on the list. In this case the first third (in return order) of the information items could be allocated red display points, the second third could be allocated green display points and the final third could be allocated blue display points.

Figure 15B:
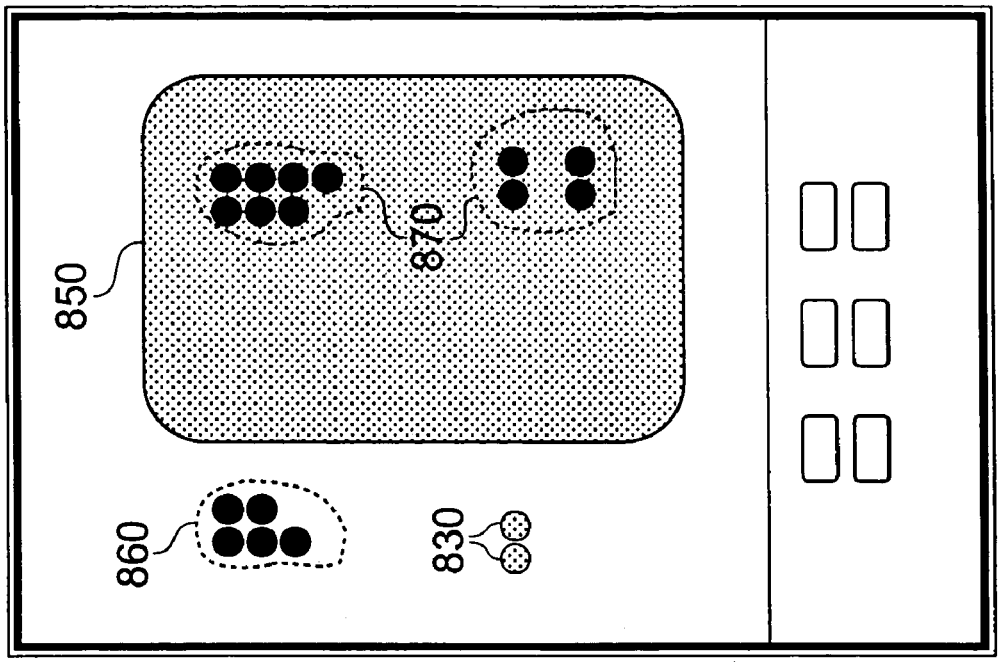
FIGS. 15A and 15B schematically illustrate a GUI on a Personal Digital Assistant in which different categories of information are represented as display points having different levels of transparency when viewed through a partially transparent user control panel.
Figure 15A:
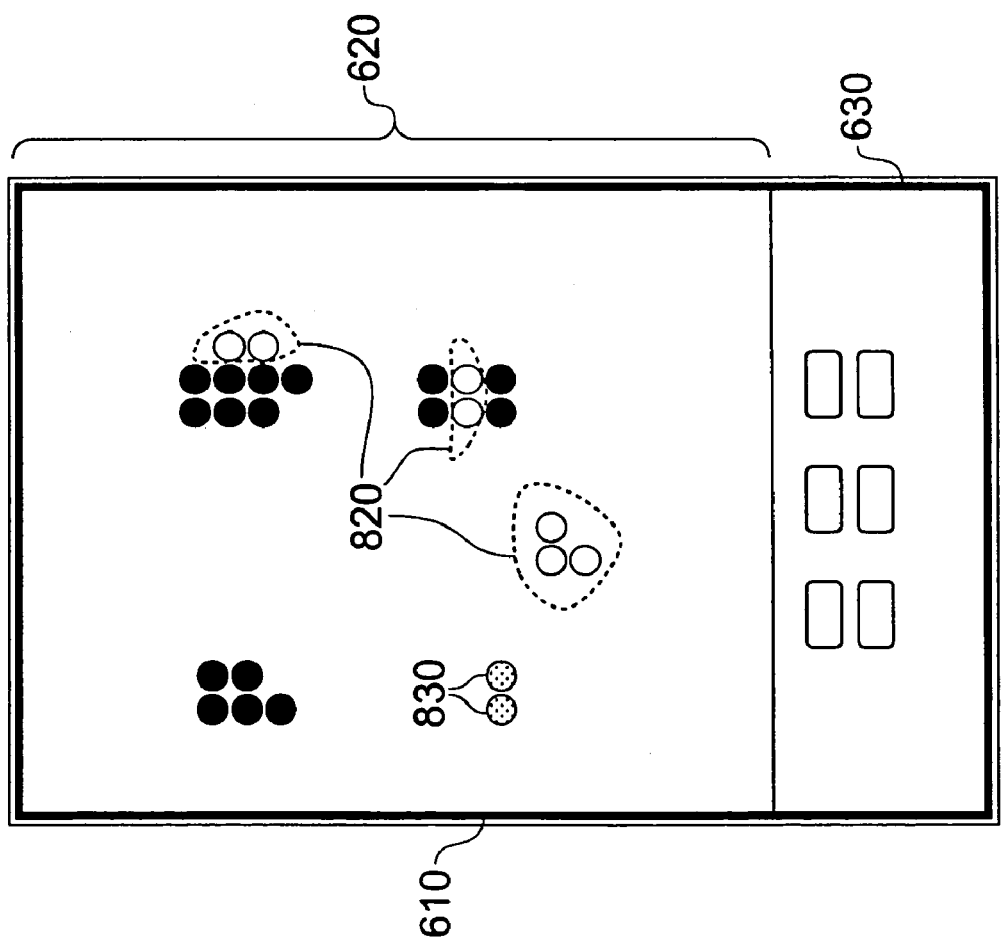

FIGS. 15A and 15B schematically illustrate a graphical user interface on the display screen 610 of the PDA 600, in which different categories of information represented by the SOM are represented as display points having different levels of transparency when viewed through a partially transparent user control panel. FIG. 15A shows all of the display points that have been rendered in the display area 620. The display points shown belong to one of three distinct relevancy classes: the least relevant category of information items are represented by the group of white display points 820; the intermediate relevance category of information items are represented by the two grey display points 830; and most relevant category of information items are represented by the three clusters of black display points. FIG. 15B shows the effect of overlaying a partially transparent user-control panel 850 such that it at least partly overlaps the display points of FIG. 15A. The overlaying of the user-control panel on the node display area makes more efficient use of the limited screen area of the PDA.

Provision of transparency effects is generally achieved using a technique known as Alpha blending. When Alpha blending is performed two colours are combined: a source colour and a destination colour. The source colour is the contribution from the (at least partially) transparent foreground object, in this case the user-control panel 850. The destination colour is the colour that already exists at the pixel location being considered and this is the result of rendering some other object, for example a display point in the node display area, that is behind the transparent object. The destination colour is the colour that will be visible through the transparent object. Each pixel of the foreground image is assigned an Alpha value representing its degree of transparency. The Alpha values are then used to calculate weighted averages of the colours of the foreground and background images for each pixel.

From a comparison of FIG. 15A and FIG. 15B it can be seen that the cluster 860 of black display points belonging to the most relevant category and the pair 830 of grey display points of intermediate relevancy remain visible since they are not overlapped by the user-control panel 850. However, in the portion of the node display that is overlapped by the user-control panel 850, the least relevant clusters 820 of white points are not prominent enough to be visible through the partially transparent user-control panel. By way of contrast, the black display points 870 corresponding to the most relevant information items do remain visible through the user-control panel (although they may be less prominent). It will be appreciated that in areas of the user-control panel responsive to user input such as dialog boxes and action buttons, it is appropriate to inhibit selection of the underlying display points. However, at least a subset of the overlapped display points remains selectable by the user.

Figure 16:
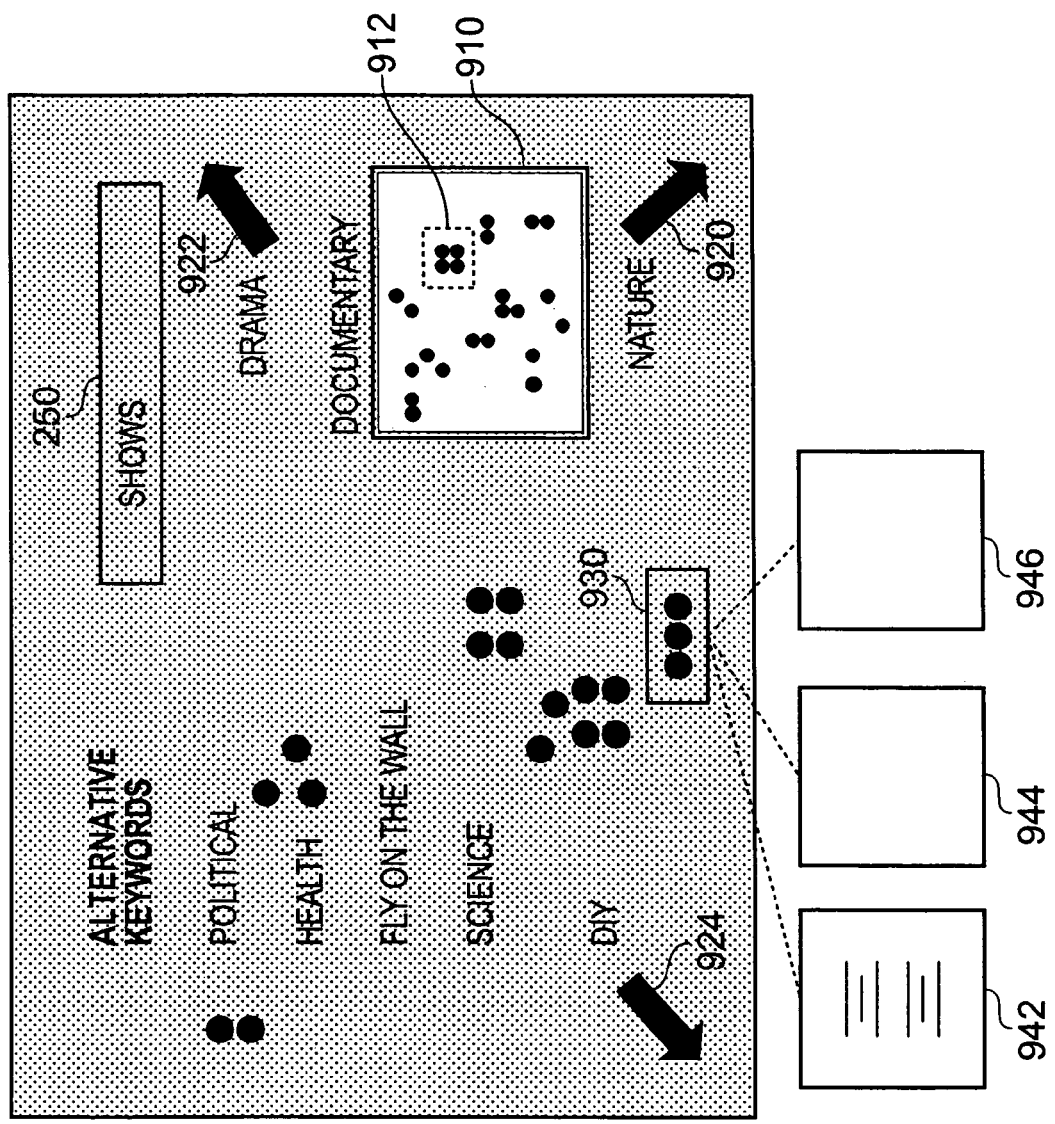
FIG. 16 schematically illustrates an embodiment in which a partially transparent user control panel is overlaid on a node display area.

FIG. 16 schematically illustrates an alternative embodiment in which a partially transparent user-control panel is overlaid on the node display area 270. In this embodiment a window 910 displays a global "zoomed out" view of the full matrix of nodes whereas the surrounding screen area displays a magnified view of only a particular subset of the nodes at any one time. The particular subset displayed corresponds to a selected region of the global view window 910. A partially transparent user-control panel overlaps the entire node display area 270, with the exception of the global view window 910. As in the embodiment of FIGS. 15A and 15B, each display point has a degree of visibility through the user control panel according to its respective degree or category of relevance. Accordingly, only the most relevant display points are prominent in the magnified view. In the global view window 910, although the user control panel does not obscure any of the display points, they are plotted on a significantly reduced scale.

In this example embodiment the keyword "shows" has been entered in the search enquiry dialogue box 250 and this has returned search citations in a number of distinct categories i.e. DIY, Drama, Nature and Documentary. The selected portion 912 of the global view window 910 corresponds to documentaries so that the display points that are prominent through the user control panel correspond to a magnified view of the portion of the node matrix relevant to documentary shows. Portion 912 is activated by a "mouse-over" event (i.e. moving the mouse to the appropriate region of the display) rather than a mouse-click. This informs the user of the region of the map to which portion 912 corresponds and an indication of the information to be found there. A mouse-click in portion 912 will cause the user to navigate to the corresponding part of the map. The user can navigate between different regions of the node map by clicking on arrows at the edges of the large-scale node display. In particular, clicking on an arrow 920 at the bottom right hand corner of the screen will lead to a view of display points relevant to the nature category, clicking on an arrow 922 at the top right-hand corner of the screen will lead to a view of display points relevant to drama shows whereas clicking on an arrow 924 at the bottom left-hand corner of the display will lead to a view of display points relevant to do-it-yourself (DIY) shows. The user can also navigate around the map by manipulating a zoom control box on the global view window 910. If the zoom control is moved the map will move accordingly and if the zoom control is resized the map will resize accordingly.

Since the region of the node matrix currently represented in the magnified view relates to documentary shows, the user-control panel displays a list of alternative keywords that can be used to refine the search of documentary shows. In particular, the user can select from the alternatives of political, health, so-called "fly on the wall" programmes or science documentaries. Although the magnified view of documentary display points is overlapped by the user-control panel, the prominent underlying display points can still be selected by the user. The cluster 930 of display points has been selected in this example and a set 942, 944, 946 of three representative key-stamp (RKS) images is displayed corresponding to each of the three selected display points. The RKS may comprise the first frame of a video sequence or a representation of a web page or other document.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. An information retrieval system comprising:
   a mapping section comprising a self organising artificial neural network including an array of nodes trained upon representations of a set of distinct information items and configured to map a representation of each information item in the set of distinct information items to a single closest corresponding node in the array of nodes of the self organising artificial neural network so that information items having similar content are mapped to nodes of the self organising artificial neural network near to each other in said array of nodes;
   a first search enquiry section configured to (1) select a subset of said information items by applying a user-defined search query against said information items, (2) detect a degree of relevance, to said search query, of each information item in said subset, and (3) provide said degrees of relevance and said subset of said information items;
   a second search enquiry section configured to identify which nodes among the array of nodes of the self organising artificial neural network are mapped to by at least some of said subset of said information items provided by the first search enquiry section; and
   a graphical user interface configured to display the array of nodes of the self organising artificial neural network in a node display area on a user display, and configured to display a representation of the nodes identified by the second enquiry section that correspond to at least some of said subset of said information items within the array of nodes of the node display area on the user display,
   said graphical user interface being operable to display each of said nodes identified by the second enquiry section with respective display properties dependent on said provided degrees of relevance.

2. A system according to claim 1, in which said information items are arranged as a number of distinct categories, said graphical user interface being operable to display said nodes in respective colours associated with a category of corresponding ones of said information items.

3. A system according to claim 1, in which said graphical user interface is arranged so that nodes corresponding to less relevant information items are displayed with greater transparency.

4. A system according to claim 1, further comprising:
   a user control for choosing one or more information items from said subset,
   the graphical user interface being operable to (1) display said subset of said information items as a list together with said displayed nodes, (2) alter a manner of display within said display area of nodes corresponding to chosen information items, and (3) update said list to reflect information items corresponding to said chosen information items.

5. A system according to claim 4, in which said graphical user interface is operable to display in at least one of a different size and by flagging those nodes corresponding to chosen information items.

6. A system according to claim 4, in which said graphical user interface is operable to display nodes corresponding to chosen information items with time-varying display properties.

7. A system according to claim 1, in which said first search arrangement comprises an interface to an internet search provider, so that said search query is communicated to said internet search provider, and search results comprising search citations, with associated degrees of relevance assigned by said internet search provider, are received from said internet search provider.

8. A system according to claim 7, in which said internet search provider is operable to communicate said search results with degrees of relevance implied by the order in which said search citations are communicated.

9. A portable data processing device comprising a system according to claim 1.

10. Apparatus for at least one of video acquisition and video processing comprising a system according to claim 1.

11. The system of claim 1, wherein the array of nodes includes a two-dimensional array of nodes.

12. The system of claim 1, wherein said graphical user interface is further configured to display a user control panel at least partly overlapping said node display area, and display said user control panel partly transparently so that at least some of the overlapped nodes are not obscured by said user control panel and some of the overlapped nodes are obscured by said user control panel.

13. The system of claim 1, wherein said graphical user interface is further configured to display each of said nodes with a degree of transparency dependent upon said detected degree of relevance of the corresponding information items.

14. The system of claim 13, wherein said graphical user interface is further configured to display with greater transparency each of said nodes corresponding to less relevant information items.

15. The system according to claim 1, wherein the graphical user interface is further configured to simultaneously display a list including at least some of said selected subset of information items and display the representation of the corresponding nodes in the node display area.

16. The system according to claim 1, wherein the array of nodes includes a Kohonen Self-Organising map.

17. An information storage method performed using an information retrieval apparatus, said method comprising:
   mapping, using a self organising artificial neural network in the information retrieval apparatus, a representation of each information item in a set of distinct information items to a single closest corresponding node in an array of nodes included in the self organising artificial neural network so that information items having similar content are mapped to nodes of the self organising artificial neural network near to each other in said array of nodes, the self organizing artificial neural network including the array of nodes trained upon representations of the set of distinct information items;

selecting a subset of said information items by applying a user-defined search query against said information items;

identifying which nodes among the array of nodes of the self organising artificial neural network are mapped to by at least some of said subset of information items selected by the selecting;

detecting and providing a degree of relevance of each information item in said subset to said search query;

displaying, on a user display device, the array of nodes of the self organising artificial neural network in a node display area;

displaying a representation of the nodes identified by the identifying that correspond to at least some of said subset of said information items within the array of nodes of the node display area on the user display, each of said nodes identified by the identifying being displayed with respective display properties dependent on said provided degrees of relevance.

18. The method of claim 17, wherein the array of nodes includes a two-dimensional array of nodes.

19. The method of claim 17, further comprising:
displaying a user control panel at least partly overlapping nodes in said node display area; and
displaying the user control panel at least partly transparently so that at least some of the overlapped nodes are not obstructed by said user control panel and some of the overlapped nodes are obscured by said user control panel.

20. The method of claim 17, further comprising:
displaying each of said nodes with a degree of transparency dependent upon said detected degree of relevance of the corresponding information items.

21. The method of claim 20, further comprising:
displaying with greater transparency each of said nodes corresponding to less relevant information items.

22. The method according to claim 17, further comprising:
simultaneously displaying
a list including at least some of said selected subset of information items and the representation of the corresponding nodes in the node display area.

23. The method according to claim 17, further comprising:
displaying the array of nodes as a Kohonen Self-Organising map.

24. A computer readable storage medium that stores computer program instructions, which when executed by a computer cause the computer to perform an information storage method comprising:

mapping, using a self organising artificial neural network, a representation of each information item in a set of distinct information items to a single closest corresponding node in an array of nodes included in the self organising artificial neural network so that information items having similar content are mapped to nodes of the self organising artificial neural network near to each other in said array of nodes, the self organising artificial neural network including the array of nodes trained upon representations of the set of distinct information items;

selecting a subset of said information items by applying a user-defined search query against said information items;

identifying which nodes among the array of nodes of the self organising artificial neural network are mapped to by at least some of said subset of information items selected by the selecting;

detecting and providing a degree of relevance of each information item in said subset to said search query;

displaying, on a user display device, the array of nodes of the self organising artificial neural network in a node display area;

displaying a representation of the nodes identified by the identifying that correspond to at least some of said subset of said information items within the array of nodes of the node display area on the user display, each of said nodes identified by the identifying being displayed with respective display properties dependent on said provided degrees of relevance.

* * * * *